US012588086B2

(12) United States Patent
Yilmaz et al.

(10) Patent No.: US 12,588,086 B2
(45) Date of Patent: Mar. 24, 2026

(54) SIDELINK CONFIGURATION IN DUAL CONNECTIVITY

(71) Applicant: Telefonaktiebolaget LM Ericsson (publ), Stockholm (SE)

(72) Inventors: Osman Nuri Can Yilmaz, Espoo (FI); Antonino Orsino, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 696 days.

(21) Appl. No.: 17/777,436

(22) PCT Filed: Nov. 18, 2020

(86) PCT No.: PCT/EP2020/082487
§ 371 (c)(1),
(2) Date: May 17, 2022

(87) PCT Pub. No.: WO2021/099359
PCT Pub. Date: May 27, 2021

(65) Prior Publication Data
US 2022/0408504 A1     Dec. 22, 2022

Related U.S. Application Data

(60) Provisional application No. 62/936,960, filed on Nov. 18, 2019.

(51) Int. Cl.
H04W 76/15          (2018.01)
H04L 1/1867         (2023.01)
(Continued)

(52) U.S. Cl.
CPC ........... H04W 76/14 (2018.02); H04L 1/1896 (2013.01); H04W 28/0263 (2013.01);
(Continued)

(58) Field of Classification Search
None
See application file for complete search history.

(56) References Cited

U.S. PATENT DOCUMENTS

| | | | | |
|---|---|---|---|---|
| 2018/0368191 A1* | 12/2018 | Vutukuri | ............... | H04W 56/00 |
| 2020/0045674 A1* | 2/2020 | Tseng | .................... | H04W 76/14 |

(Continued)

FOREIGN PATENT DOCUMENTS

| | | |
|---|---|---|
| CN | 106470388 A | 3/2017 |
| CN | 106535332 A | 3/2017 |

(Continued)

OTHER PUBLICATIONS

Lee—U.S. Appl. No. 62/910,413 Provisional App (2019) (Year: 2019).*

(Continued)

*Primary Examiner* — Andre Tacdiran
(74) *Attorney, Agent, or Firm* — Murphy, Bilak & Homiller, PLLC

(57) ABSTRACT

A wireless device (12A) receives a sidelink configuration from each of multiple network nodes (20A, 20B) serving the wireless device (12A). The wireless device (12A) selects, from the received sidelink configurations, a sidelink configuration (16A) that is consistent or compatible with a sidelink configuration (16B) of another wireless device (12B) with which the wireless device (12A) is to communicate over a sidelink. The wireless device (12A) in some embodiments transmits, to each of one or more of the network nodes (20A, 20B) serving the wireless device (12A), an indication of the selected sidelink configuration (16A).

7 Claims, 27 Drawing Sheets

(51) Int. Cl.

| | | |
|---|---|---|
| *H04W 28/02* | (2009.01) | |
| *H04W 28/04* | (2009.01) | |
| *H04W 72/25* | (2023.01) | |
| *H04W 76/14* | (2018.01) | |
| *H04W 92/18* | (2009.01) | |

(52) U.S. Cl.
CPC .......... *H04W 28/04* (2013.01); *H04W 72/25* (2023.01); *H04W 76/15* (2018.02); *H04W 92/18* (2013.01)

(56) References Cited

U.S. PATENT DOCUMENTS

| | | | | |
|---|---|---|---|---|
| 2020/0314669 A1* | 10/2020 | Lee | ...................... | H04W 76/19 |
| 2021/0051587 A1* | 2/2021 | Wu | ...................... | H04W 68/02 |
| 2021/0051653 A1* | 2/2021 | Park | ...................... | H04W 8/22 |
| 2021/0105787 A1* | 4/2021 | Park | ................... | H04W 72/542 |
| 2021/0144791 A1* | 5/2021 | Kang | ................... | H04W 80/02 |
| 2022/0007447 A1* | 1/2022 | Hong | ................... | H04W 76/18 |
| 2023/0319852 A1* | 10/2023 | Lee | ...................... | H04W 72/23 |
| | | | | 370/328 |

FOREIGN PATENT DOCUMENTS

| | | | |
|---|---|---|---|
| CN | 107040864 A | | 8/2017 |
| EP | 3416436 A1 | | 12/2018 |
| WO | 2019061180 A1 | | 4/2019 |
| WO | WO2021062708 | * | 9/2019 |

OTHER PUBLICATIONS

Park—U.S. Appl. No. 62/910,361 Provisional App (2019) (Year: 2019).*

3GPP, "3rd Generation Partnership Project; Technical Specification Group Radio Access Network; NR; Study on NR Vehicle-to-Everything (V2X) (Release 16)", 3GPP TR 38.885 V16.0.0, Mar. 2019, 1-122.

3GPP, "3rd Generation Partnership Project; Technical Specification Group Radio Access Network; Study on NR-based access to unlicensed spectrum (Release 16)", 3GPP TR 38.889 V16.0.0, Dec. 2018, 1-119.

Ericsson, "Remaining issues on RLC AM and UM support in SL", 3GPP TSG-RAN WG2 #108, TDoc R2-1915271, Reno, USA, Nov. 18-22, 2019, 1-5.

Huawei, "Summary of email discussion [107bis#96][V2X] RLC AM mismatch", 3GPP TSG-RAN WG2 #108, R2-1915981, Reno, Nevada, Nov. 18-22, 2019, 1-25.

Vivo, "Left issues on NR SL RLC and PDCP", 3GPP TSG-RAN2 Meeting #108, R2-1914922 (R2-1912253), Reno, USA, Nov. 18-22, 2019, 1-6.

Zte, et al., "Further Discussion on sidelink RLC AM and UM for unicast", 3GPP TSG RAN WG2 Meeting #108, R2-1914547, Reno, USA, Nov. 18-22, 2019, 1-6.

CATT, "Open Issues for the Bi-directional SLRB", 3GPP TSG-RAN WG2 Meeting #108, R2-1914450, Reno, USA, Nov. 18-22, 2019, 1-6.

Ericsson, "Discussion on SL AS configuration handling over NR Uu", 3GPP TSG-RAN WG2 #108, R2-1915381, (Resubmission of R2-1913332), Reno, USA, Nov. 18-22, 2019, 1-2.

* cited by examiner

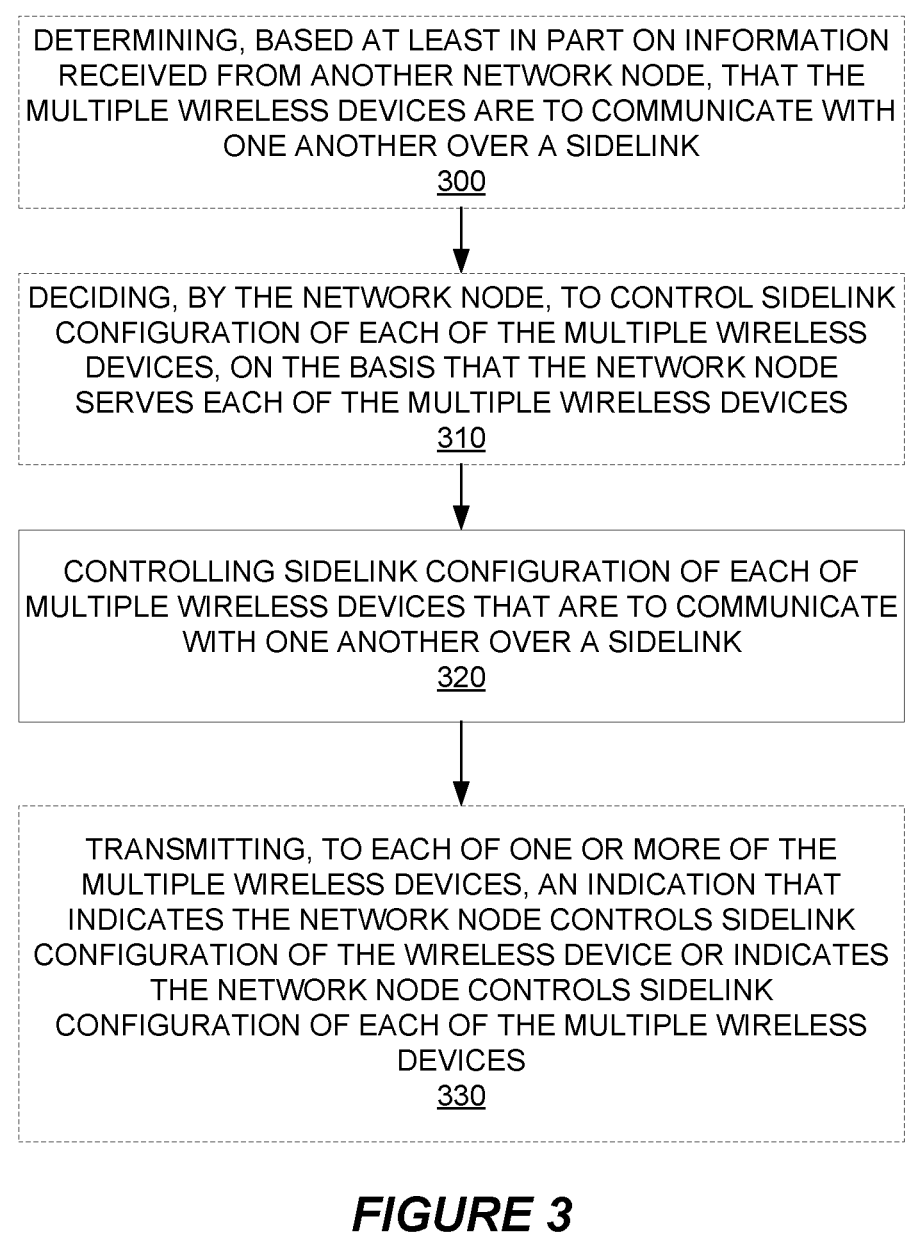

DETERMINING, BASED AT LEAST IN PART ON INFORMATION RECEIVED FROM ANOTHER NETWORK NODE, THAT THE MULTIPLE WIRELESS DEVICES ARE TO COMMUNICATE WITH ONE ANOTHER OVER A SIDELINK
300

DECIDING, BY THE NETWORK NODE, TO CONTROL SIDELINK CONFIGURATION OF EACH OF THE MULTIPLE WIRELESS DEVICES, ON THE BASIS THAT THE NETWORK NODE SERVES EACH OF THE MULTIPLE WIRELESS DEVICES
310

CONTROLLING SIDELINK CONFIGURATION OF EACH OF MULTIPLE WIRELESS DEVICES THAT ARE TO COMMUNICATE WITH ONE ANOTHER OVER A SIDELINK
320

TRANSMITTING, TO EACH OF ONE OR MORE OF THE MULTIPLE WIRELESS DEVICES, AN INDICATION THAT INDICATES THE NETWORK NODE CONTROLS SIDELINK CONFIGURATION OF THE WIRELESS DEVICE OR INDICATES THE NETWORK NODE CONTROLS SIDELINK CONFIGURATION OF EACH OF THE MULTIPLE WIRELESS DEVICES
330

FIGURE 3

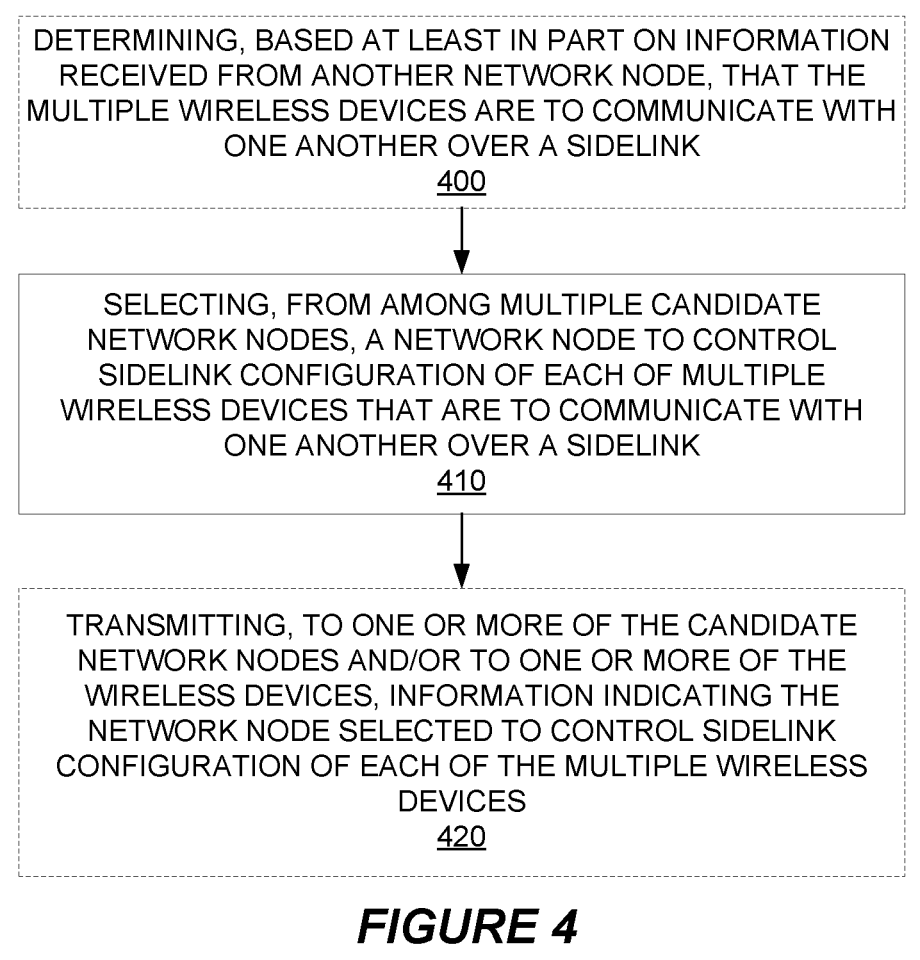

DETERMINING, BASED AT LEAST IN PART ON INFORMATION RECEIVED FROM ANOTHER NETWORK NODE, THAT THE MULTIPLE WIRELESS DEVICES ARE TO COMMUNICATE WITH ONE ANOTHER OVER A SIDELINK
400

SELECTING, FROM AMONG MULTIPLE CANDIDATE NETWORK NODES, A NETWORK NODE TO CONTROL SIDELINK CONFIGURATION OF EACH OF MULTIPLE WIRELESS DEVICES THAT ARE TO COMMUNICATE WITH ONE ANOTHER OVER A SIDELINK
410

TRANSMITTING, TO ONE OR MORE OF THE CANDIDATE NETWORK NODES AND/OR TO ONE OR MORE OF THE WIRELESS DEVICES, INFORMATION INDICATING THE NETWORK NODE SELECTED TO CONTROL SIDELINK CONFIGURATION OF EACH OF THE MULTIPLE WIRELESS DEVICES
420

FIGURE 4

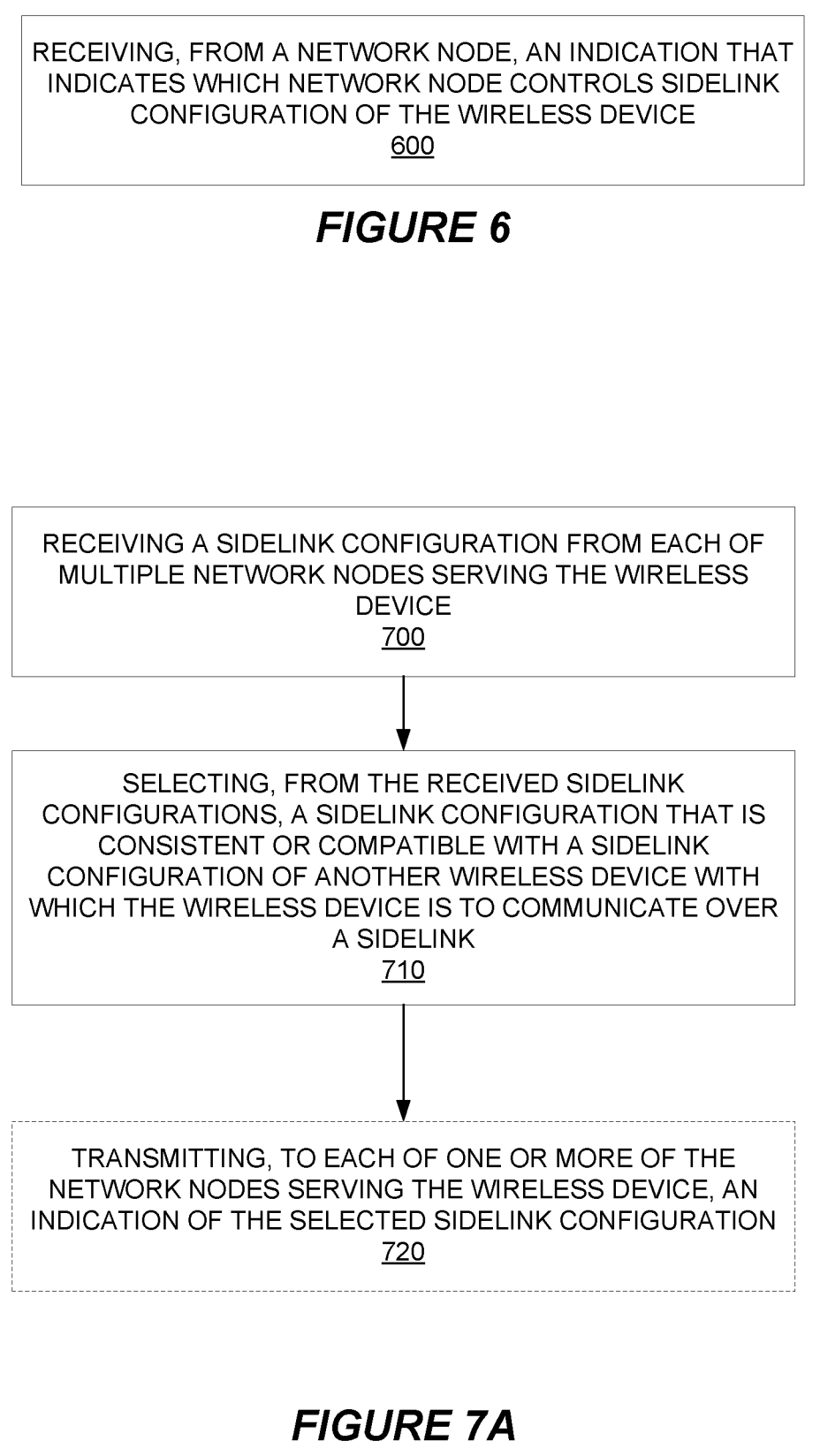

RECEIVING, FROM A NETWORK NODE, AN INDICATION THAT INDICATES WHICH NETWORK NODE CONTROLS SIDELINK CONFIGURATION OF THE WIRELESS DEVICE
600

FIGURE 6

RECEIVING A SIDELINK CONFIGURATION FROM EACH OF MULTIPLE NETWORK NODES SERVING THE WIRELESS DEVICE
700

SELECTING, FROM THE RECEIVED SIDELINK CONFIGURATIONS, A SIDELINK CONFIGURATION THAT IS CONSISTENT OR COMPATIBLE WITH A SIDELINK CONFIGURATION OF ANOTHER WIRELESS DEVICE WITH WHICH THE WIRELESS DEVICE IS TO COMMUNICATE OVER A SIDELINK
710

TRANSMITTING, TO EACH OF ONE OR MORE OF THE NETWORK NODES SERVING THE WIRELESS DEVICE, AN INDICATION OF THE SELECTED SIDELINK CONFIGURATION
720

FIGURE 7A

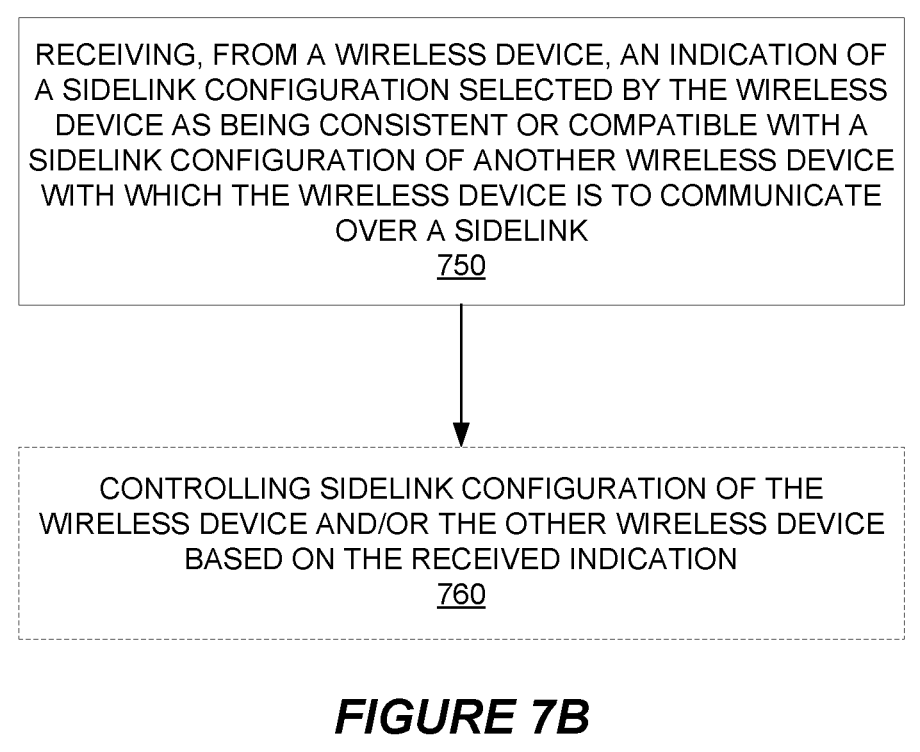

RECEIVING, FROM A WIRELESS DEVICE, AN INDICATION OF
A SIDELINK CONFIGURATION SELECTED BY THE WIRELESS
DEVICE AS BEING CONSISTENT OR COMPATIBLE WITH A
SIDELINK CONFIGURATION OF ANOTHER WIRELESS DEVICE
WITH WHICH THE WIRELESS DEVICE IS TO COMMUNICATE
OVER A SIDELINK
750

CONTROLLING SIDELINK CONFIGURATION OF THE
WIRELESS DEVICE AND/OR THE OTHER WIRELESS DEVICE
BASED ON THE RECEIVED INDICATION
760

*FIGURE 7B*

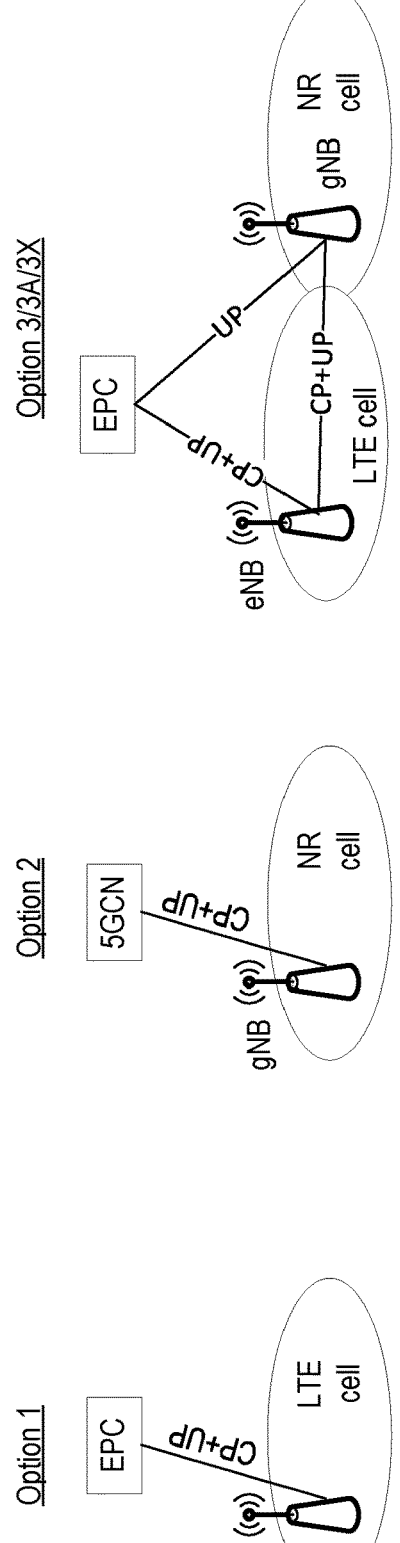
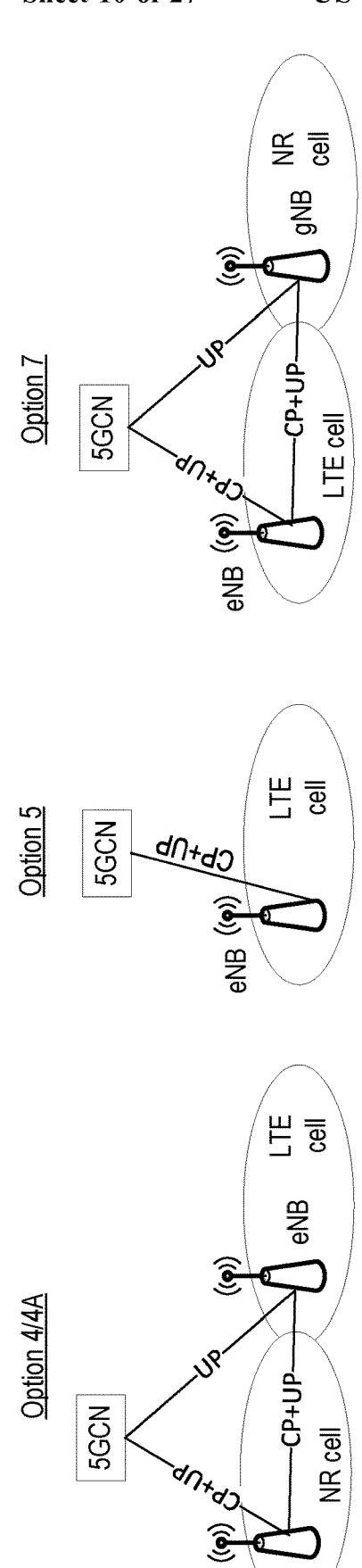
*FIGURE 10*

SIDELINK CONFIGURATION IN DUAL CONNECTIVITY

TECHNICAL FIELD

The present application relates generally to dual connectivity in a wireless communication system, and relates more particularly to sidelink configuration in dual connectivity.

BACKGROUND

A sidelink is a link between wireless devices that enables device-to-device (D2D) discovery and/or communication. When a wireless device is in network coverage, the network may configure the sidelink for the wireless device, e.g., in terms of quality of service (QoS) parameters associated with each sidelink QoS flow, sidelink radio bearer configuration, sidelink QoS flow to sidelink radio bearer mapping, and the like. Network control of sidelink configuration, however, proves complicated under some contexts. For example, if the wireless devices that will communicate over the sidelink are served by different network nodes, the wireless devices risk ending up with incompatible sidelink configurations.

SUMMARY

Some embodiments herein control, coordinate, select, or otherwise provide for sidelink configuration of wireless devices that are to communicate with one another over a sidelink, e.g., so that sidelink configurations of the wireless devices are consistent or compatible with one another. For example, some embodiments centrally control sidelink configuration of the wireless devices from the same network node. Where at least one of the wireless devices has multiple serving nodes in multi-connectivity operation, for instance, some embodiments control sidelink configuration of the wireless devices from whichever of the serving nodes also serves the other wireless device(s) with which sidelink communication is to be performed. In other embodiments, by contrast, which may be applicable even when the wireless devices have no serving node in common, the serving nodes for the respective wireless device may coordinate with one another regarding the sidelink configurations to be used, e.g., in a decentralized manner. In still other embodiments, a wireless device may receive different prospective sidelink configurations from different respective network nodes and select whichever of the sidelink configurations is consistent with or compatible with a sidelink configuration of another wireless device with which sidelink communication is to be performed. Ensuring consistency or compatibility between the sidelink configurations of wireless devices in this way may advantageously avoid configuration failures and service latency.

More particularly embodiments herein include a method performed by a wireless device. The method comprises receiving a sidelink configuration from each of multiple network nodes serving the wireless device. The method also comprises selecting, from the received sidelink configurations, a sidelink configuration that is consistent or compatible with a sidelink configuration of another wireless device with which the wireless device is to communicate over a sidelink. The method in some embodiments also comprises transmitting, to each of one or more of the network nodes serving the wireless device, an indication of the selected sidelink configuration.

In some embodiments, a sidelink configuration comprises a Radio Link Control, RLC, mode configuration comprising configuration of RLC unacknowledged mode or RLC acknowledged mode. In one or more of these embodiments, selecting a sidelink configuration comprises selecting, from the received sidelink configurations, a sidelink configuration that comprises the same RLC mode configuration as an RLC mode configuration of the sidelink configuration of another wireless device with which the wireless device is to communicate over the sidelink.

In some embodiments, a sidelink configuration comprises a Logical Channel ID to RLC mode mapping. In this case, selecting a sidelink configuration comprises selecting, from the received sidelink configurations, a sidelink configuration that comprises the same Logical Channel ID to RLC mode mapping as a Logical Channel ID to RLC mode mapping of the sidelink configuration of another wireless device with which the wireless device is to communicate over the sidelink.

In some embodiments, a sidelink configuration comprises at least one of any one or more of: sidelink radio bearer configuration; quality of service flow to sidelink radio bearer mapping; configuration of a resource pool for sidelink communication; Radio Link Control, RLC, mode configuration comprising configuration of RLC unacknowledged mode or RLC acknowledged mode; Logical Channel ID to RLC mode mapping; and default sidelink configuration parameters.

In some embodiments, at least one of the network nodes acts as a master node for multi-connectivity operation, and at least one other of the network nodes acts as a secondary node for said multi-connectivity operation.

In some embodiments, the method further comprises requesting a sidelink configuration from each of the multiple network nodes.

In some embodiments, the method further comprises receiving, from each of one or more of the network nodes serving the wireless device, information identifying one or more other wireless devices to which the network node has sent the same sidelink configuration received from that network node.

Other embodiments herein include a method performed by a network node. The method comprises receiving, from a wireless device, an indication of a sidelink configuration that the wireless device selected as being consistent or compatible with a sidelink configuration of another wireless device with which the wireless device is to communicate over a sidelink.

In some embodiments, a sidelink configuration comprises a Radio Link Control, RLC, mode configuration comprising configuration of RLC unacknowledged mode or RLC acknowledged mode. In one or more of these embodiments, the indication comprises an indication of a sidelink configuration that the wireless device selected as having the same RLC mode configuration as an RLC mode configuration of the sidelink configuration of another wireless device with which the wireless device is to communicate over the sidelink.

In some embodiments, a sidelink configuration comprises a Logical Channel ID to RLC mode mapping, and wherein the indication comprises an indication of a sidelink configuration that the wireless device selected as having the same Logical Channel ID to RLC mode mapping as a Logical Channel ID to RLC mode mapping of the sidelink configuration of another wireless device with which the wireless device is to communicate over the sidelink.

In some embodiments, a sidelink configuration comprises at least one of any one or more of: sidelink radio bearer configuration; quality of service flow to sidelink radio bearer mapping; configuration of a resource pool for sidelink communication; Radio Link Control, RLC, mode configuration comprising configuration of RLC unacknowledged mode or RLC acknowledged mode; Logical Channel ID to RLC mode mapping; and default sidelink configuration parameters.

In some embodiments, the network node acts as a master node for multi-connectivity operation.

In some embodiments, the network node acts as a secondary node for multi-connectivity operation.

In some embodiments, the method further comprises transmitting, to the wireless device, information identifying one or more other wireless devices to which the network node has sent the same sidelink configuration as a sidelink configuration transmitted to the wireless device.

Other embodiments herein include a wireless device configured to receive a sidelink configuration from each of multiple network nodes serving the wireless device. The wireless device is also configured to select, from the received sidelink configurations, a sidelink configuration that is consistent or compatible with a sidelink configuration of another wireless device with which the wireless device is to communicate over a sidelink. The wireless device is also configured to transmit, to each of one or more of the network nodes serving the wireless device, an indication of the selected sidelink configuration.

In some embodiments, the wireless device is configured to perform the steps described above for a wireless device.

Other embodiments herein include a network node configured to receive, from a wireless device, an indication of a sidelink configuration that the wireless device selected as being consistent or compatible with a sidelink configuration of another wireless device with which the wireless device is to communicate over a sidelink.

In some embodiments, the network node is configured to perform the steps described above for a network node.

Other embodiments herein include a computer program comprising instructions which, when executed by at least one processor of a wireless device, causes the wireless device to perform the steps described above for a wireless device. Other embodiments herein include a computer program comprising instructions which, when executed by at least one processor of a network node, causes the network node to perform the steps described above for a network node. Other embodiments herein include a carrier containing any of the computer programs described above, wherein the carrier is one of an electronic signal, optical signal, radio signal, or computer readable storage medium.

Other embodiments herein include a wireless device comprising communication circuitry and processing circuitry. The processing circuitry is configured to receive a sidelink configuration from each of multiple network nodes serving the wireless device. The processing circuitry is also configured to select, from the received sidelink configurations, a sidelink configuration that is consistent or compatible with a sidelink configuration of another wireless device with which the wireless device is to communicate over a sidelink. The processing circuitry in some embodiments is also configured to transmit, to each of one or more of the network nodes serving the wireless device, an indication of the selected sidelink configuration.

In some embodiments, the processing circuitry is configured to perform the steps described above for a wireless device.

Other embodiments herein include a network node comprising communication circuitry and processing circuitry. The processing circuitry is configured to receive, from a wireless device, an indication of a sidelink configuration that the wireless device selected as being consistent or compatible with a sidelink configuration of another wireless device with which the wireless device is to communicate over a sidelink.

In some embodiments, the processing circuitry is configured to perform the steps described above for a network node.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 3 is a logic flow diagram of a method performed by a network node according to some embodiments.

FIG. 4 is a logic flow diagram of a method performed by a network node according to other embodiments.

FIG. 6 is a logic flow diagram of a method performed by a wireless device according to some embodiments.

FIG. 7A is a logic flow diagram of a method performed by a wireless device according to other embodiments.

FIG. 7B is a logic flow diagram of a method performed by a network node according to other embodiments.

FIG. 10 is a block diagram of different ways to deploy a 5G network with or without interworking with LTE, according to some embodiments.

DETAILED DESCRIPTION

Figure 1:
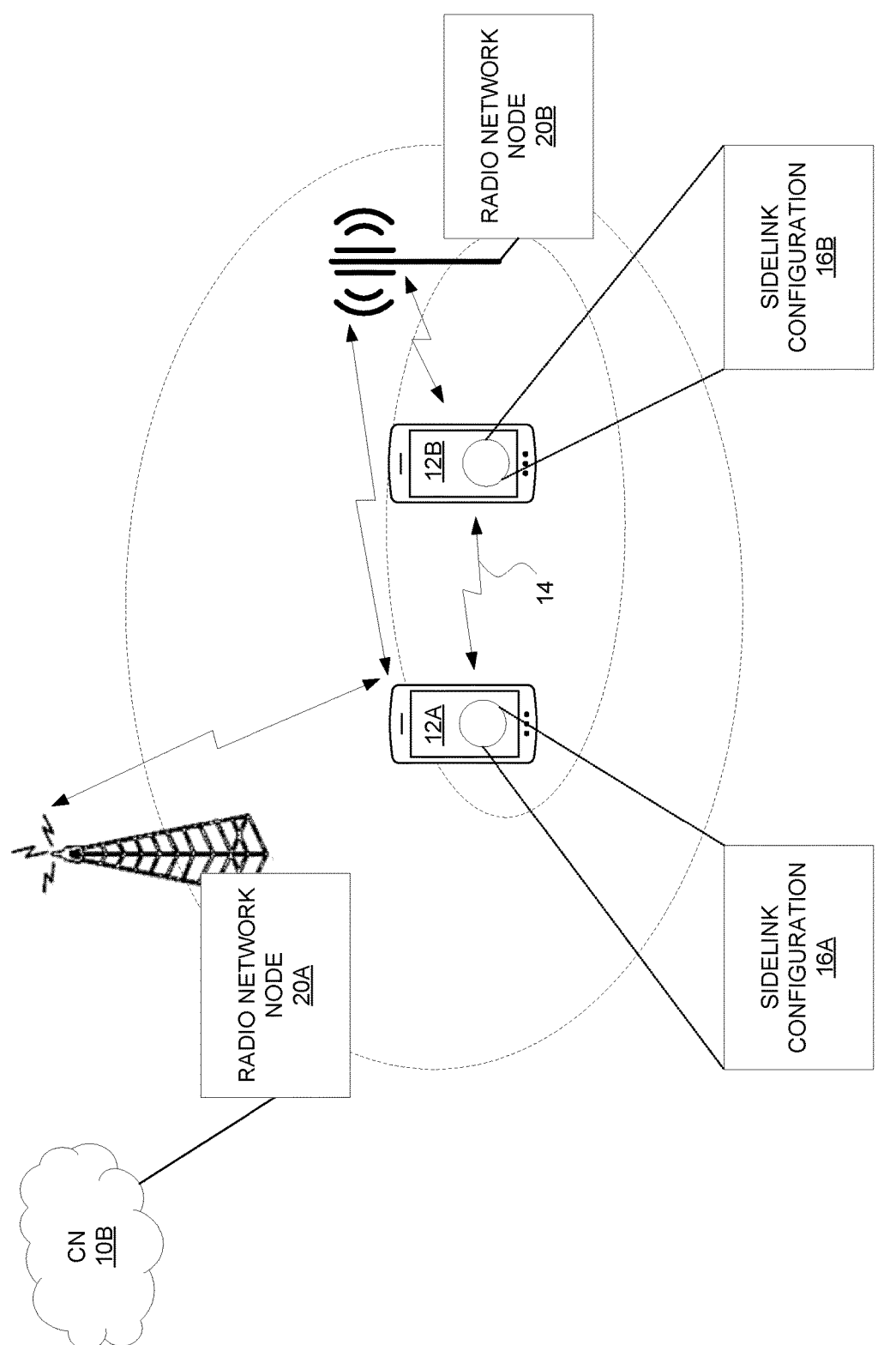
FIG. 1 is a block diagram of a wireless communication network according to some embodiments.

FIG. 1 shows a wireless communication system 10 according to some embodiments, e.g., a Long Term Evolution (LTE) system or a New Radio (NR) system. In this example, wireless device 12A is to communicate with wireless device 12B over a sidelink 14. Communication over the sidelink 14 means that the wireless devices 12A, 12B communicate directly with one another, rather than via a path that traverses any network node (e.g., base station). Such communication may for instance include user plane communication, e.g., in the form of Proximity Services (ProSe) direct communication.

Wireless devices 12A, 12B are to communicate with one another over the sidelink 14 according to respective sidelink configurations 16A, 16B. Sidelink configuration 16A constitutes the configuration of the sidelink 14 at or from the perspective of wireless device 12A, whereas sidelink configuration 16B constitutes the configuration of the sidelink 14 at or from the perspective of wireless device 12B. Each of the sidelink configurations 16A, 16B may for instance comprises of one or more of: (i) sidelink radio bearer configuration; (ii) quality of service flow to sidelink radio bearer mapping; (iii) configuration of a resource pool for sidelink communication; (iv) Radio Link Control (RLC) mode configuration comprising configuration of RLC unacknowledged mode or RLC acknowledged mode; (v) Logical Channel ID to RLC mode mapping; or (vi) default sidelink configuration parameters.

Some embodiments herein control, coordinate, select, or otherwise provide for the sidelink configurations 16A, 16B of the wireless devices 12A, 12B to be consistent or compatible with one another. The sidelink configurations 16A, 16B are consistent or compatible with one another if those sidelink configurations 16A, 16B allow the wireless device 12A, 12B to establish sidelink connectivity without any errors and thus avoid configuration failures. The consistency or compatibility referred to in some embodiments may thereby mean that the sidelink configurations 16A, 16B are fully consistent or fully compatible with one another. In some embodiments, for example, the sidelink configurations 16A, 16B are consistent or compatible with one another if, for each of one or more parameters, that parameter has the same value in both of the sidelink configurations 16A, 16B. For instance, in embodiments where the sidelink configurations 16A, 16B comprise an RLC mode configuration for the sidelink 14, the sidelink configurations 16A, 16B are consistent or compatible with one another if the sidelink configurations 16A, 16B configure the same RLC mode for the sidelink 14, e.g., if sidelink configurations 16A and 16B both configure RLC unacknowledged mode for the sidelink 14 or both configure RLC acknowledged mode for the sidelink 14. Additionally or alternatively, in embodiments where the sidelink configurations 16A, 16B comprise a logical channel ID to RLC mode mapping for the sidelink 14, the sidelink configurations 16A, 16B are consistent or compatible with one another if the sidelink configurations 16A, 16B configure the same logical channel ID to RLC mode mapping. As yet another example, in embodiments where the sidelink configurations 16A, 16B comprise a default sidelink configuration parameter, the sidelink configurations 16A, 16B are consistent or compatible with one another if the sidelink configurations 16A, 16B additionally or alternatively configure the same value for the default sidelink configuration parameter, e.g., both sidelink configurations 16A, 16B configure PDCP duplication to be 'on' by default or both sidelink configurations 16A, 16B configure SDAP headers to be 'present' by default. Regardless of the nature of the consistency or compatibility, ensuring consistency or compatibility between the sidelink configurations of wireless devices in this way may advantageously avoid configuration failures and service latency.

For example, some embodiments centrally control sidelink configuration of the wireless devices 12A, 12B from the same network node. As shown in one example, wireless device 12A is served by multiple radio network nodes 20A, 20B, e.g., in multi-connectivity operation. Specifically, radio network node 20A acts as a master node (MN) for wireless device 12A and radio network node 20B acts as a secondary node (SN) for wireless device 12B. Wireless device 12B may by contrast only be served by radio network node 20B, as shown, or in other embodiments may also operate with multi-connectivity. In any case, some embodiments control sidelink configuration of the wireless devices 12A, 12B from whichever of the radio network nodes 20A, 20B commonly serves both of the wireless device 12A, 12B. In this example, then, radio network node 20B would control sidelink configuration of both wireless device 12A and wireless device 12B, on the basis that radio network node 20B serves both wireless device 12A and wireless device 12B. This means that radio network node 20B may centrally control the sidelink configurations 16A, 16B to be consistent or compatible with one another.

Note that the radio network node 20B may control the sidelink configurations 16A, 16B in some embodiments in the sense that the radio network node 20B governs, dictates, or otherwise controls the parameters of those sidelink configurations 16A, 16B. The radio network node 20B need not necessarily generate or even transmit the sidelink configurations 16A, 16B to the wireless device 12A, 12B. In some embodiments, for instance, the radio network node 20B generates the sidelink configuration 16A for wireless device 12A but transmits that sidelink configuration 16A to radio network node 20A for relaying to the wireless device 12A, e.g., within an encapsulated RRC message.

FIG. 3 depicts a method performed by a network node 20B in accordance with particular embodiments. The method includes controlling sidelink configuration 16A, 16B of each of multiple wireless devices 12A, 12B that are to communicate with one another over a sidelink 14 (Block 320). In some embodiments, this controlling comprises controlling sidelink configurations 16A, 16B of the multiple wireless devices 12A, 12B to be consistent or compatible with one another.

In some embodiments, such control is on the basis that the network node 20B serves each of the multiple wireless devices 12A, 12B.

In some embodiments, the method may beforehand comprise deciding, by the network node 20B, to control sidelink configuration of each of the multiple wireless devices 12A, 12B, on the basis that the network node 20B serves each of the multiple wireless devices 12A, 12B (Block 310).

In some embodiments, at least one of the multiple wireless devices 12A, 12B is served by the network node and one or more other network nodes.

In some embodiments, the network node 20B acts as a master node for at least one of the multiple wireless devices 12A, 12B in multi-connectivity operation. In one such embodiment, the network node acts 20B as a secondary node for at least one other one of the multiple wireless devices 12A, 12B in multi-connectivity.

In other embodiments, at least one of the multiple wireless devices 12A, 12B is not configured with, or is not operating with, multi-connectivity.

In any event, the method in some embodiments further comprises determining, based at least in part on information received from another network node, that the multiple wireless devices 12A, 12B are to communicate with one another over a sidelink (Block 300). The information received from another network node may for example include identifying information that identifies at least one of the multiple wireless devices 12A, 12B, e.g., a Layer 2 identity.

In some embodiments, the method further includes transmitting, to each of one or more of the multiple wireless devices 12A, 12B, an indication that indicates the network node 20B controls sidelink configuration of the wireless device or indicates the network node 20B controls sidelink configuration of each of the multiple wireless devices 12A, 12B (Block 330).

In some embodiments, the network node 20B is a central unit or a distributed unit of a radio network node.

In some embodiments, controlling comprises, for each of the multiple wireless devices 12A, 12B, generating a sidelink configuration and transmitting that sidelink configuration to the wireless device or to another network node for relay to the wireless device.

In some embodiments, controlling comprises controlling sidelink configurations of the multiple wireless devices 12A, 12B to be consistent or compatible with one another.

In some embodiments, a sidelink configuration of a wireless device comprises of one or more of: sidelink radio bearer configuration; quality of service flow to sidelink radio bearer mapping; configuration of a resource pool for sidelink communication; Radio Link Control, RLC, mode configuration comprising configuration of RLC unacknowledged mode or RLC acknowledged mode; Logical Channel ID to RLC mode mapping; or default sidelink configuration parameters.

In some embodiments, the multiple wireless devices 12A, 12B are requesting or have requested sidelink configuration for the purpose of communicating with one another over a sidelink.

FIG. 4 depicts a method performed by a network node in accordance with other particular embodiments. The method includes selecting, from among multiple candidate network nodes, a network node to control sidelink configuration of each of multiple wireless devices 12A, 12B that are to communicate with one another over a sidelink (Block 410). In some embodiments, this selecting comprises selecting a network node that serves each of the multiple wireless devices 12A, 12B.

In some embodiments, the method also comprises transmitting, to one or more of the candidate network nodes and/or to one or more of the wireless devices 12A, 12B, information indicating the network node selected to control sidelink configuration of each of the multiple wireless devices 12A, 12B (Block 420).

In some embodiments, at least one of the multiple wireless devices 12A, 12B is served by multiple network nodes in multi-connectivity operation.

In some embodiments, the selected network node acts as a master node for at least one of the multiple wireless devices 12A, 12B in multi-connectivity operation.

In some embodiments, the selected network node acts as a secondary node for at least one other one of the multiple wireless devices 12A, 12B in multi-connectivity.

In some embodiments, at least one of the multiple wireless devices 12A, 12B is not configured with, or is not operating with, multi-connectivity.

In some embodiments, the method comprises determining, based at least in part on information received from another network node, that the multiple wireless devices 12A, 12B are to communicate with one another over a sidelink (Block 400). In some embodiments, for example, the information received from another network node includes identifying information that identifies at least one of the multiple wireless devices 12A, 12B. For instance, the identifying information may include a Layer 2 identity of the at least one of the multiple wireless devices 12A, 12B.

In some embodiments, the method further comprises transmitting, to each of one or more of the multiple wireless devices 12A, 12B, an indication that indicates the network node selected to control sidelink configuration of the wireless device or indicates the network node selected to control sidelink configuration of each of the multiple wireless devices 12A, 12B.

In some embodiments, the selected network node is a central unit or a distributed unit of a radio network node.

In some embodiments, the network node selected to control sidelink configuration of each of the multiple wireless devices 12A, 12B is selected to, for each of the multiple wireless devices 12A, 12B, generate a sidelink configuration and transmit that sidelink configuration to the wireless device.

In some embodiments, the network node selected to control sidelink configuration of each of the multiple wireless devices 12A, 12B is selected to control sidelink configurations of the multiple wireless devices to be consistent or compatible with one another.

In some embodiments, sidelink configuration of a wireless device comprises of one or more of: sidelink radio bearer configuration; quality of service flow to sidelink radio bearer mapping; configuration of a resource pool for sidelink communication; Radio Link Control, RLC, mode configuration comprising configuration of RLC unacknowledged mode or RLC acknowledged mode; Logical Channel ID to RLC mode mapping; or default sidelink configuration parameters.

In some embodiments, the multiple wireless devices 12A, 12B are requesting or have requested sidelink configuration for the purpose of communicating with one another over a sidelink.

In some embodiments, selecting is performed responsive to receiving a request for sidelink configuration from one or more of the multiple wireless devices 12A, 12B.

In some embodiments, selecting is performed responsive to receiving an inquiry from one of the candidate network nodes inquiring as to which network node is to control sidelink configuration of each of the multiple wireless devices 12A, 12B.

In some embodiments, said selecting is performed as part of setting up the sidelink between the wireless devices 12A, 12B, as part of a procedure for modifying which network node acts as a master node for multi-connectivity operation of at least one of the wireless devices, or as part of a procedure for adding or modifying which network node acts as a secondary node for multi-connectivity operation of at least one of the wireless devices 12A, 12B.

Figure 2:
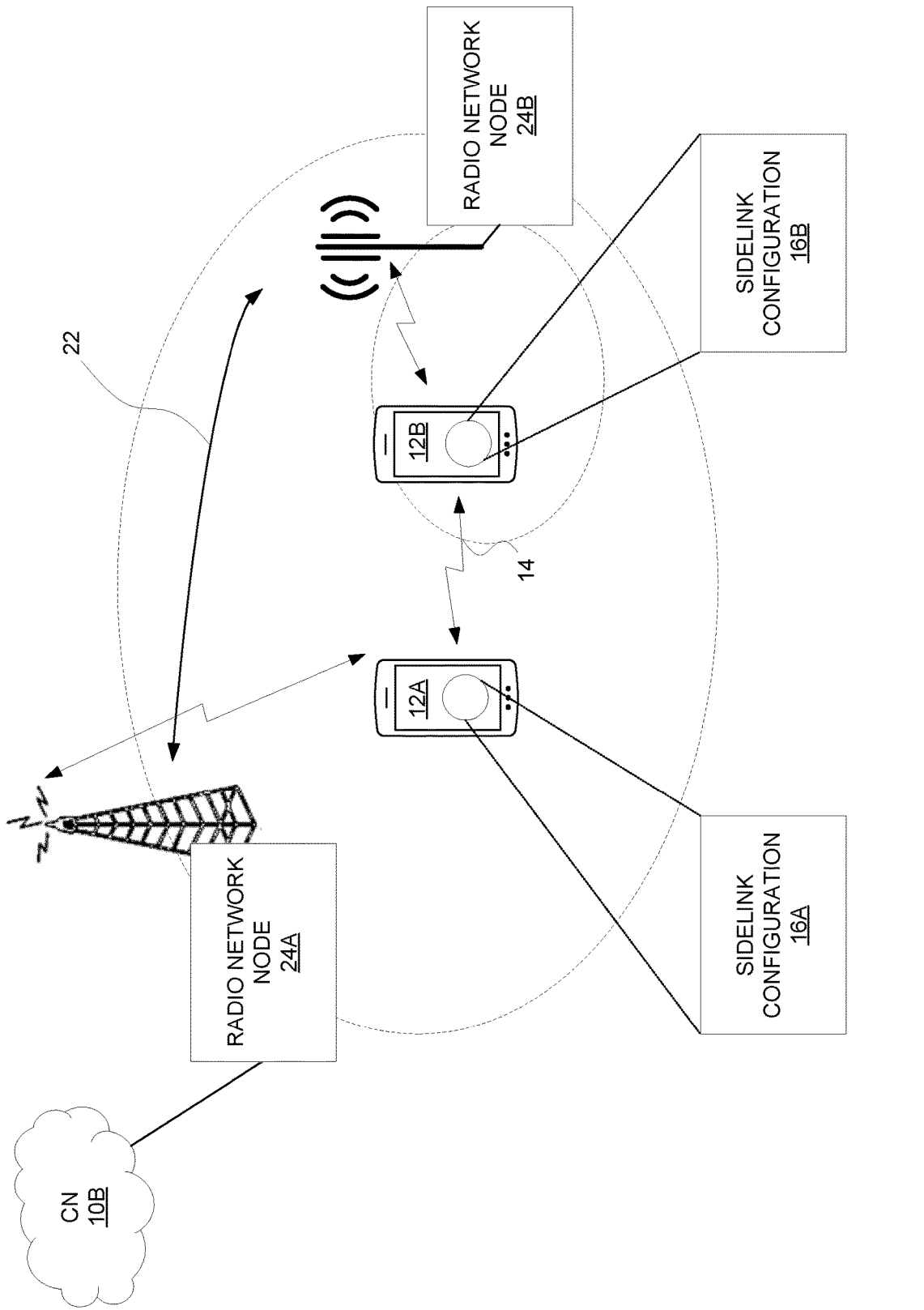
FIG. 2 is a block diagram of a wireless communication network according to other embodiments.

In other embodiments, by contrast, which may be applicable even in embodiments shown in FIG. 2 where the wireless devices 12A, 12B have no serving node in common, the serving nodes 24A, 24B for the respective wireless device 12A, 12B may coordinate 22 with one another (e.g., over an inter-node interface) regarding the sidelink configurations 16A, 16B to be used, e.g., in a decentralized manner. That is, rather than one of the network nodes 24A, 24B centrally controlling both of the sidelink configurations 16A, 16B, the network nodes 24A, 24B coordinate with one another in such a way that the sidelink configurations 16A, 16B will be consistent or compatible with one another.

Figure 5:
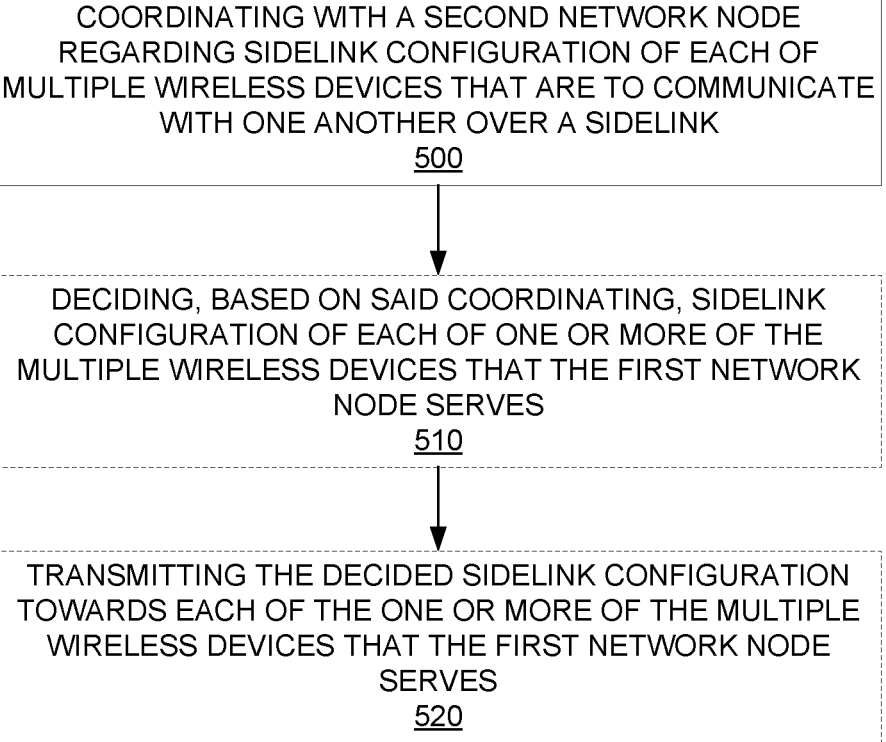
FIG. 5 is a logic flow diagram of a method performed by a network node according to still other embodiments.

For example, FIG. 5 depicts a method performed by a network node 24A in accordance with these other embodiments. The method includes coordinating with a second network node 24B regarding sidelink configuration of each of multiple wireless devices 12A, 12B that are to communicate with one another over a sidelink (Block 500).

In some embodiments, this coordinating comprises transmitting to the second network node 24B information indicating one or more sidelink configurations able to be used at the first network node 24A; and/or receiving from the second network node 24B information indicating one or more sidelink configurations able to be used at the second network node 24B. Alternatively or additionally, in some embodiments, this coordinating comprises transmitting to the second network node 24B information indicating one or more sidelink configurations that the second network node 24B is to use; and/or receiving from the second network node 24B information indicating one or more sidelink configurations that the first network node 24A is to use. Alternatively or additionally, in some embodiments, this coordinating comprises transmitting to the second network node 24B information indicating one or more sidelink configurations that the first network node 24A proposes to use; and/or receiving from the second network node 24B information indicating one or more sidelink configurations that the second network node 24B proposes to use. Alternatively or additionally, in some embodiments, this coordinating comprises transmitting to the second network node 24B information indicating one or more sidelink configurations that the first network node 24A accepts or rejects for use; and/or receiving from the second network node 24B information indicating one or more sidelink configurations that the second network node 24B accepts or rejects for use.

In some embodiments, the method further comprises deciding, based on said coordinating, sidelink configuration 16A, 16B of each of one or more of the multiple wireless devices 12A, 12B that the first network node 24A serves (Block 510). In this case, the method may also comprise transmitting the decided sidelink configuration towards each of the one or more of the multiple wireless devices 12A, 12B that the first network node 24A serves (Block 520).

For example, in some embodiments, the first network node 24A decides the sidelink configuration 16A of wireless device 12A, based on information received from the second network node 24B indicating the sidelink configuration 16B that the second network node 24B is able to use, proposes to use, or accepts for use. This sidelink configuration 16B may for instance be the one that the second network node 24B proposes to use for the other wireless device 12B served by the second network node 24B.

In some embodiments, the first network node acts as a master node for at least one of the multiple wireless devices 12A, 12B in multi-connectivity operation, and wherein the second network node as a secondary node for at least one other of the multiple wireless devices 12A, 12B in multi-connectivity operation.

In some embodiments, at least two of the wireless devices 12A, 12B have no serving network node in common.

In some embodiments, coordinating is performed during, or as part of, a procedure for adding or modifying a second node for at least one of the multiple wireless devices 12A, 12B in multi-connectivity.

In some embodiments, coordinating is performed during, or as part of, a procedure for handover of one or more of the multiple wireless devices 12A, 12B.

In some embodiments, at least one of the multiple wireless devices 12A, 12B is served by multiple network nodes.

In some embodiments, sidelink configuration of a wireless device comprises of one or more of: sidelink radio bearer configuration; quality of service flow to sidelink radio bearer mapping; configuration of a resource pool for sidelink communication; Radio Link Control, RLC, mode configuration comprising configuration of RLC unacknowledged mode or RLC acknowledged mode; Logical Channel ID to RLC mode mapping; or default sidelink configuration parameters.

In some embodiments, the multiple wireless devices 12A, 12B are requesting or have requested sidelink configuration for the purpose of communicating with one another over a sidelink.

FIG. 6 depicts a method performed by a wireless device in accordance with still other particular embodiments. The method includes receiving, from a network node, an indication that indicates which network node controls sidelink configuration of the wireless device (Block 600).

In some embodiments, at least one of the network nodes acts as a master node for multi-connectivity operation, and at east one other of the network nodes acts as a secondary node for said multi-connectivity operation.

In some embodiments, a sidelink configuration comprises of one or more of: sidelink radio bearer configuration; quality of service flow to sidelink radio bearer mapping; configuration of a resource pool for sidelink communication; Radio Link Control, RLC, mode configuration comprising configuration of RLC unacknowledged mode or RLC acknowledged mode; Logical Channel ID to RLC mode mapping; or default sidelink configuration parameters.

In still other embodiments not shown, a wireless device 12A may receive different prospective sidelink configurations from different respective network nodes 24A, 24B and select whichever of the sidelink configurations is consistent with or compatible with the sidelink configuration 16B of a wireless device 12B with which sidelink communication is to be performed. In this case, then, the wireless device 12A itself may evaluate and/or ensure the consistency or compatibility of the sidelink configurations 16A, 16B with one another. The wireless device 12A in some embodiments may also report the selected sidelink configuration to one or more of the network nodes 24A, 24B, e.g., for use by the network node(s) in sidelink configuration or otherwise.

FIG. 7A depicts a method performed by a wireless device 12A in accordance with still other particular embodiments. The method includes receiving a sidelink configuration from each of multiple network nodes 24A, 24B serving the wireless device 12A (Block 700). The method also comprises selecting, from the received sidelink configurations, a sidelink configuration 16A that is consistent or compatible with a sidelink configuration 16B of another wireless device 12B with which the wireless device 12A is to communicate over a sidelink 14 (Block 710). The method may further comprise transmitting, to each of one or more of the network nodes 24A, 24B serving the wireless device 12A, an indication of the selected sidelink configuration 16A (Block 720).

In some embodiments, the method further comprises requesting a sidelink configuration from each of the multiple network nodes 24A, 24B.

In some embodiments, the method further comprises receiving, from each of one or more of the network nodes 24A, 24B serving the wireless device 12A, information identifying one or more other wireless devices to which the network node has sent the same sidelink configuration received from that network node.

In some embodiments, at least one of the network nodes 24A, 24B acts as a master node for multi-connectivity operation, and at least one other of the network nodes acts as a secondary node for said multi-connectivity operation.

In some embodiments, a sidelink configuration comprises of one or more of: sidelink radio bearer configuration; quality of service flow to sidelink radio bearer mapping; configuration of a resource pool for sidelink communication; Radio Link Control, RLC, mode configuration comprising configuration of RLC unacknowledged mode or RLC acknowledged mode; Logical Channel ID to RLC mode mapping; or default sidelink configuration parameters.

FIG. 7B depicts a method performed by a network node in accordance with still other particular embodiments. The method includes receiving, from a wireless device 12A, an indication of a sidelink configuration 16A selected by the wireless device 12A as being consistent or compatible with a sidelink configuration 16B of another wireless device 12B with which the wireless device 12A is to communicate over a sidelink 14 (Block 750). In some embodiments, the method further includes controlling sidelink configuration of the wireless device 12A and/or the other wireless device 12B based on the received indication (Block 760).

In some embodiments, the method further comprises transmitting, to the wireless device 12A, information identifying one or more other wireless devices to which the network node has sent the same sidelink configuration.

In some embodiments, the network node acts as a master node for multi-connectivity operation, and at least one other of the network nodes acts as a secondary node for said multi-connectivity operation.

In some embodiments, a sidelink configuration comprises of one or more of: sidelink radio bearer configuration; quality of service flow to sidelink radio bearer mapping; configuration of a resource pool for sidelink communication; Radio Link Control, RLC, mode configuration comprising configuration of RLC unacknowledged mode or RLC acknowledged mode; Logical Channel ID to RLC mode mapping; or default sidelink configuration parameters.

Embodiments herein also include corresponding apparatuses. Embodiments herein for instance include a wireless device configured to perform any of the steps of any of the embodiments described above for the wireless device.

Embodiments also include a wireless device 12A or 12B comprising processing circuitry and power supply circuitry. The processing circuitry is configured to perform any of the steps of any of the embodiments described above for the wireless device 12A or 12B. The power supply circuitry is configured to supply power to the wireless device 12A or 12B.

Embodiments further include a wireless device 12A or 12B comprising processing circuitry. The processing circuitry is configured to perform any of the steps of any of the embodiments described above for the wireless device 12A or 12B. In some embodiments, the wireless device 12A or 12B further comprises communication circuitry.

Embodiments further include a wireless device 12A or 12B comprising processing circuitry and memory. The memory contains instructions executable by the processing circuitry whereby the wireless device 12A or 12B is configured to perform any of the steps of any of the embodiments described above for the wireless device 12A or 12B.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device 12A or 12B. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node 20A or 20B configured to perform any of the steps of any of the embodiments described above for the radio network node 20A or 20B.

Embodiments also include a radio network node 20A or 20B comprising processing circuitry and power supply circuitry. The processing circuitry is configured to perform any of the steps of any of the embodiments described above for the radio network node 20A or 20B. The power supply circuitry is configured to supply power to the radio network node 20A or 20B.

Embodiments further include a radio network node 20A or 20B comprising processing circuitry. The processing circuitry is configured to perform any of the steps of any of the embodiments described above for the radio network node 20A or 20B. In some embodiments, the radio network node 20A or 20B further comprises communication circuitry.

Embodiments further include a radio network node 20A or 20B comprising processing circuitry and memory. The memory contains instructions executable by the processing circuitry whereby the radio network node 20A or 20B is configured to perform any of the steps of any of the embodiments described above for the radio network node 20A or 20B.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 8:
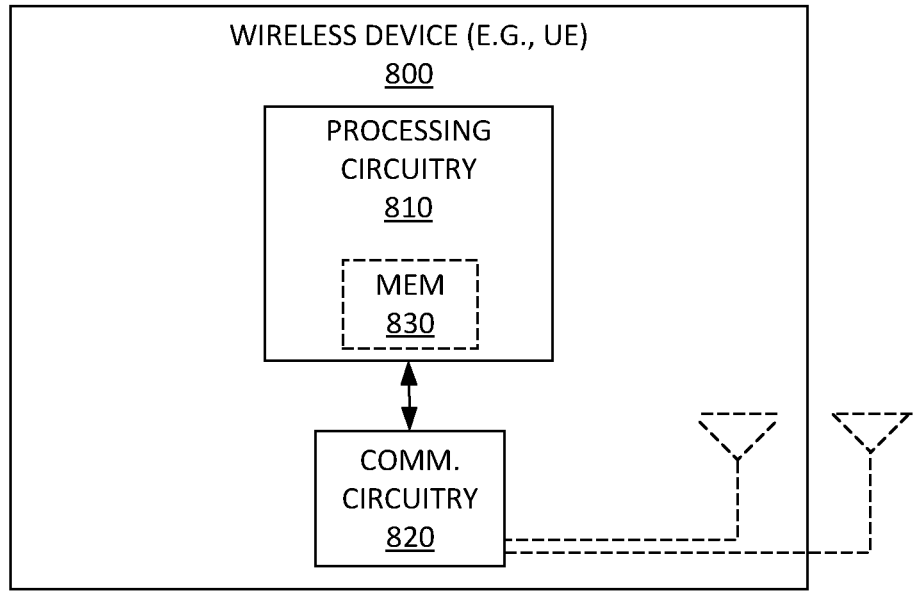
FIG. 8 is a block diagram of a wireless device according to some embodiments.

FIG. 8 for example illustrates a wireless device 800 (e.g., wireless device 12A or 12B) as implemented in accordance with one or more embodiments. As shown, the wireless device 800 includes processing circuitry 810 and communication circuitry 820. The communication circuitry 820 (e.g., radio circuitry) is configured to transmit and/or receive information to and/or from one or more other nodes, e.g., via any communication technology. Such communication may occur via one or more antennas that are either internal or external to the wireless device 800. The processing circuitry 810 is configured to perform processing described above, e.g., in FIG. 3, FIG. 4, and/or FIG. 5, such as by executing instructions stored in memory 830. The processing circuitry 810 in this regard may implement certain functional means, units, or modules.

Figure 9:
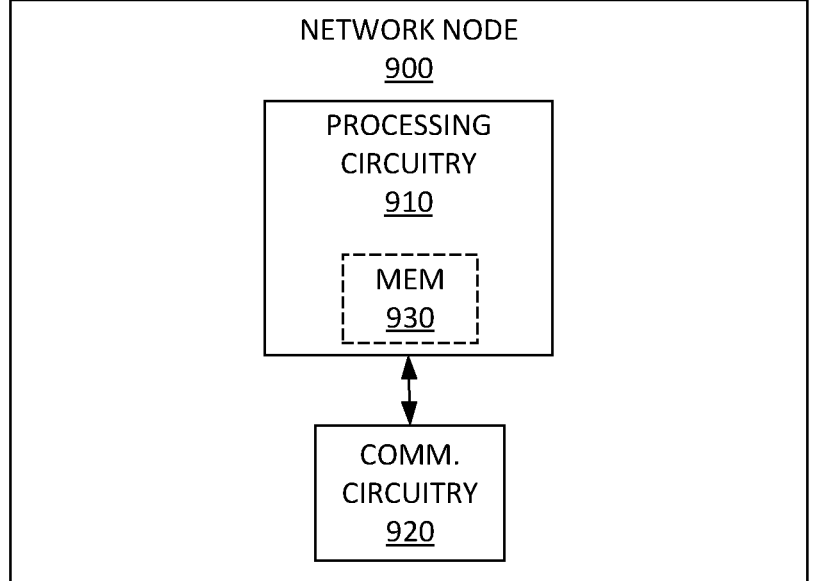
FIG. 9 is a block diagram of a network node according to some embodiments.

FIG. 9 illustrates a network node 900 (e.g., radio network node 20A or 20B) as implemented in accordance with one or more embodiments. As shown, the network node 900 includes processing circuitry 910 and communication circuitry 920. The communication circuitry 920 is configured to transmit and/or receive information to and/or from one or more other nodes, e.g., via any communication technology. The processing circuitry 910 is configured to perform processing described above, e.g., in FIG. 6 or FIG. 7, such as by executing instructions stored in memory 930. The processing circuitry 910 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Some embodiments herein are applicable to multi-connectivity. Multi-connectivity in this regard refers to the simultaneous connection of a wireless device (e.g., at a radio resource control, RRC, layer) to multiple different radio network nodes, or to multiple different cells provided by different radio network nodes. The multiple different radio network nodes or cells may use the same radio access technology (e.g., both may use Evolved Universal Terrestrial Radio Access (E-UTRA) or both may use New Radio (NR)). Or, the multiple different radio network nodes or cells may use different radio access technologies, e.g., one may use E-UTRA and another may use NR.

One example of multi-connectivity is dual connectivity (DC) in which a wireless device is simultaneously connected to two different radio network nodes, or to two different cells provided by two different radio network nodes. In this case, the wireless device may be configured with a so-called master cell group (MCG) and a secondary cell group (SCG), where the MCG includes one or more cells provided by the radio network node acting as a master node (MN) and the SCG includes one or more cells served by the radio network node acting as a secondary node (SN). The master node may be a master in the sense that it controls the secondary node and/or provides the control plane connection to the core network. For example, E-UTRA-NR (EN) DC refers to where the master node uses E-UTRA and the secondary node uses NR, whereas NR-E-UTRA (NE) refers to where the master node uses NR and the secondary node uses E-UTRA.

For example, in multi-connectivity operation, a wireless device with multiple receivers (Rx) and/or transmitters (Tx) may utilize radio resources amongst one or more radio access technologies (e.g., New Radio, NR, and/or E-UTRA) provided by multiple distinct schedulers connected via a non-ideal backhaul. Multi-radio dual connectivity (MR-DC) in this regard is a generalization of Intra-E-UTRA DC, where a multiple Rx/Tx wireless device may be configured to utilize resources provided by two different nodes connected via a non-ideal backhaul, one providing NR access and the other one providing either E-UTRA or NR access. One node acts as the master node (MN) and the other as a SN. E-UTRAN for instance supports MR-DC via E-UTRA-NR dual connectivity (EN-DC), in which a wireless device is connected to one eNB that acts as a MN and one en-gNB that acts as a secondary node (SN). Either way, in MR-DC, the wireless device may have a single Radio Resource Control (RRC) state, based on the MN RRC and a single control plane connection towards the core network.

More specifically, some embodiments herein are applicable to multi-connectivity (e.g., dual connectivity) as specified by the 3$^{rd}$ Generation Partnership Project (3GPP), e.g., for Long Term Evolution (LTE) or between LTE and New Radio (NR). In dual connectivity (DC), two nodes are involved: a master node (MN or MeNB) and a Secondary Node (SN, or SeNB). Multi-connectivity (MC) generally captures the case when there are two or more than 2 nodes involved. Also, it has been proposed in 3GPP that DC is used in the Ultra Reliable Low Latency Communications (URLLC) cases in order to enhance the robustness and to avoid connection interruptions.

Embodiments herein are applicable to any of multiple different ways to deploy a 5G network with or without interworking with LTE (also referred to as E-UTRA) and evolved packet core (EPC), as depicted in FIG. 10. In principle, NR and LTE can be deployed without any inter-working, denoted by NR stand-alone (SA) operation; that is, gNB in NR can be connected to 5G core network (5GC) and eNB can be connected to EPC with no interconnection between the two (Option 1 and Option 2 FIG. 10). On the other hand, the first supported version of NR is the so-called EN-DC (E-UTRAN-NR Dual Connectivity), illustrated by Option 3 in FIG. 10. In such a deployment, dual connectivity between NR and LTE is applied with LTE as the master and NR as the secondary node. The radio access network (RAN) node (gNB) supporting NR may not have a control plane connection to core network (EPC); instead, it relies on the LTE as master node (MeNB). This is also called as "Non-standalone NR". Notice that in this case the functionality of an NR cell is limited and would be used for connected mode UEs as a booster and/or diversity leg, but an RRC_IDLE UE cannot camp on these NR cells.

With introduction of 5GC, other options may be also valid and applicable to embodiments herein. As mentioned above, Option 2 supports stand-alone NR deployment where gNB is connected to 5GC. Similarly, LTE can also be connected to 5GC using Option 5 in FIG. 10 (also known as eLTE, E-UTRA/5GC, or LTE/5GC and the node can be referred to as an ng-eNB). In these cases, both NR and LTE are seen as part of the NG-RAN (and both the ng-eNB and the gNB can be referred to as NG-RAN nodes). It is worth noting that Option 4 and Option 7 in FIG. 10 are other variants of dual connectivity between LTE and NR which will be standard-ized as part of NG-RAN connected to 5GC, denoted by MR-DC (Multi-Radio Dual Connectivity). Under the MR-DC umbrella, then, embodiments herein may be applicable as:

EN-DC (Option 3): LTE is the master node and NR is the secondary (EPC CN employed)

NE-DC (Option 4): NR is the master node and LTE is the secondary (5GCN employed)

NGEN-DC (Option 7): LTE is the master node and NR is the secondary (5GCN employed)

NR-DC (variant of Option 2): Dual connectivity where both the master and secondary are NR (5GCN employed).

As migration for these options may differ from different operators, it is possible to have deployments with multiple options in parallel in the same network e.g. there could be an eNB base station supporting Option 3, 5 and 7 in the same network as an NR base station supporting 2 and 4. In combination with dual connectivity solutions between LTE and NR, it is also possible to support CA (Carrier Aggre-gation) in each cell group (i.e. master cell group, MCG, and secondary cell group, SCG) and dual connectivity between nodes on the same radio access technology (RAT) (e.g. NR-NR DC). For the LTE cells, a consequence of these different deployments is the co-existence of LTE cells asso-ciated to eNBs connected to EPC, 5GC or both EPC/5GC.

LTE DC and EN-DC are designed differently when it comes to which nodes control what. Basically, there are two options: (1) Centralized solution (like LTE-DC); and (2) Decentralized solution (like EN-DC).

Figure 11:
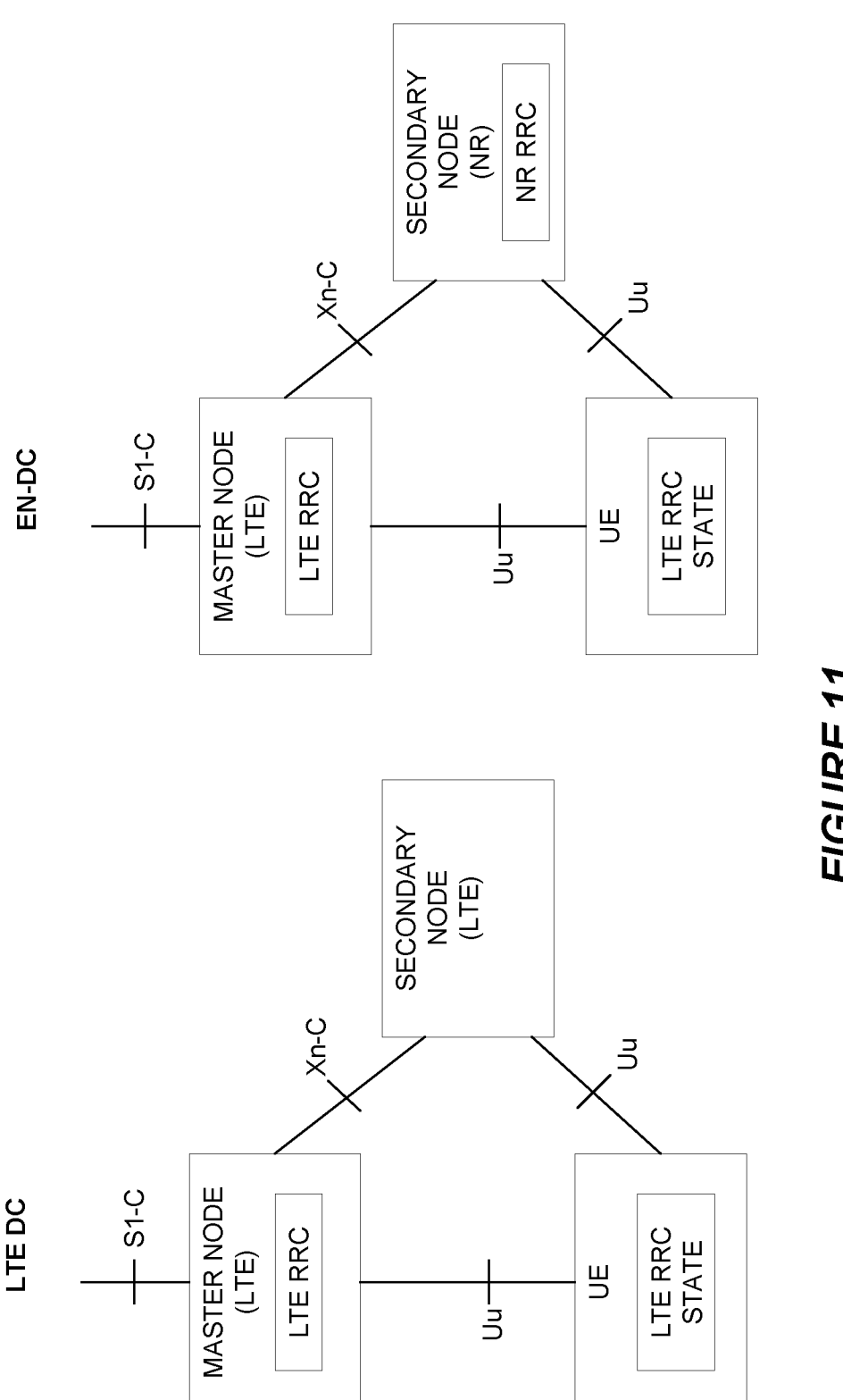
FIG. 11 is a block diagram of a control plane architecture for LTE DC and EN-DC according to some embodiments.

FIG. 11 shows the schematic control plane architecture for LTE DC and EN-DC according to some embodiments. The main difference here is that in EN-DC, the secondary node (SN) has a separate Radio Resource Control (RRC) entity (NR RRC). This means that the SN can control the user equipment (UE) also; sometimes without the knowl-edge of the master node (MN) but often the SN need to coordinate with the MN. In LTE-DC, the RRC decisions are always coming from the MN (MN to UE). Note however, the SN still decides the configuration of the SN, since it is only the SN itself that has knowledge of what kind of resources, capabilities etc. it has.

For EN-DC, the major changes compared to LTE DC are the introduction of a split bearer from the SN (known as SCG split bearer), the introduction of a split bearer for RRC; and the introduction of a direct RRC from the SN (also referred to as SCG SRB).

Figure 12:
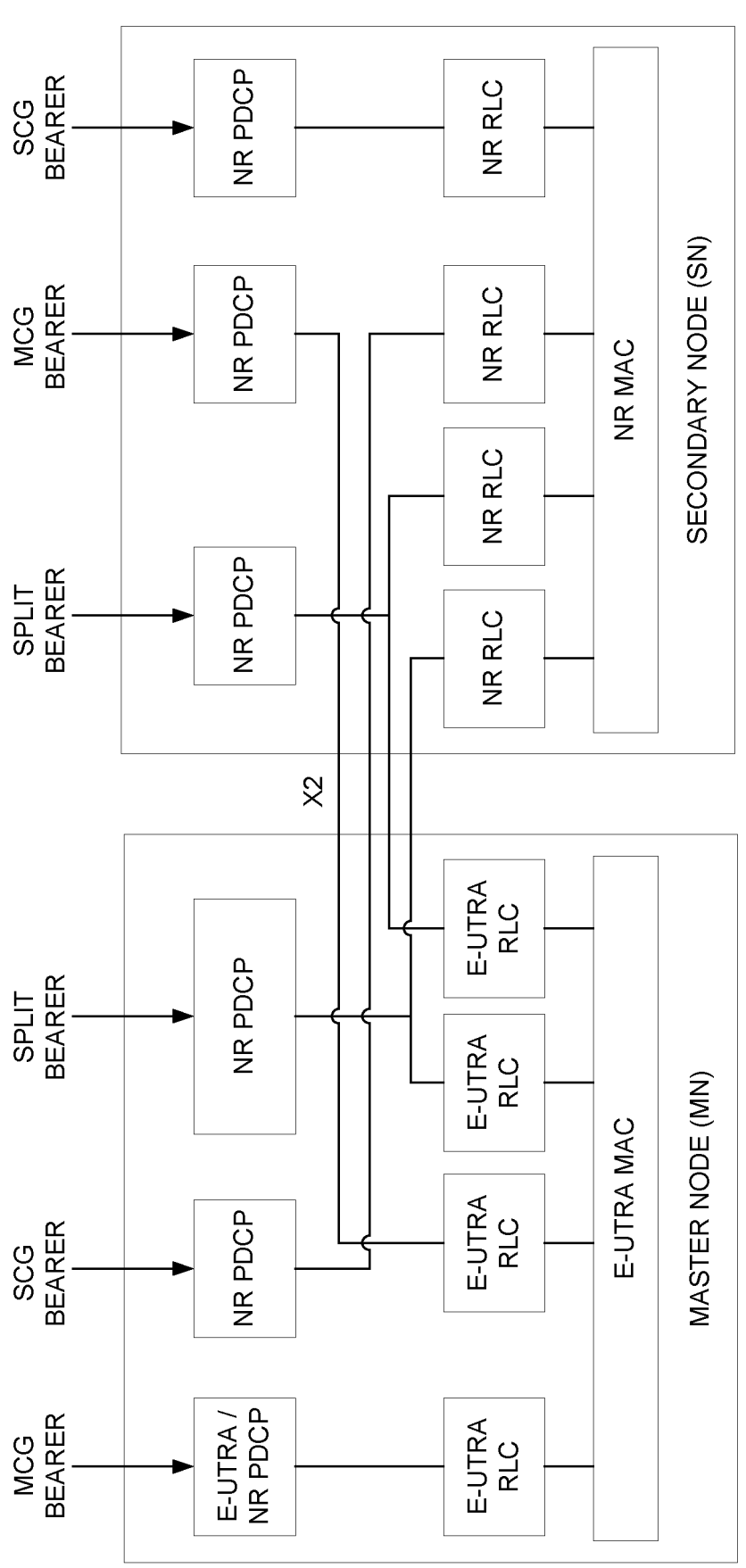
FIGS. 12 and 13 are block diagrams of the user plane (UP) and Control Plane (CP) architectures for EN-DC according to some embodiments.
Figure 13:
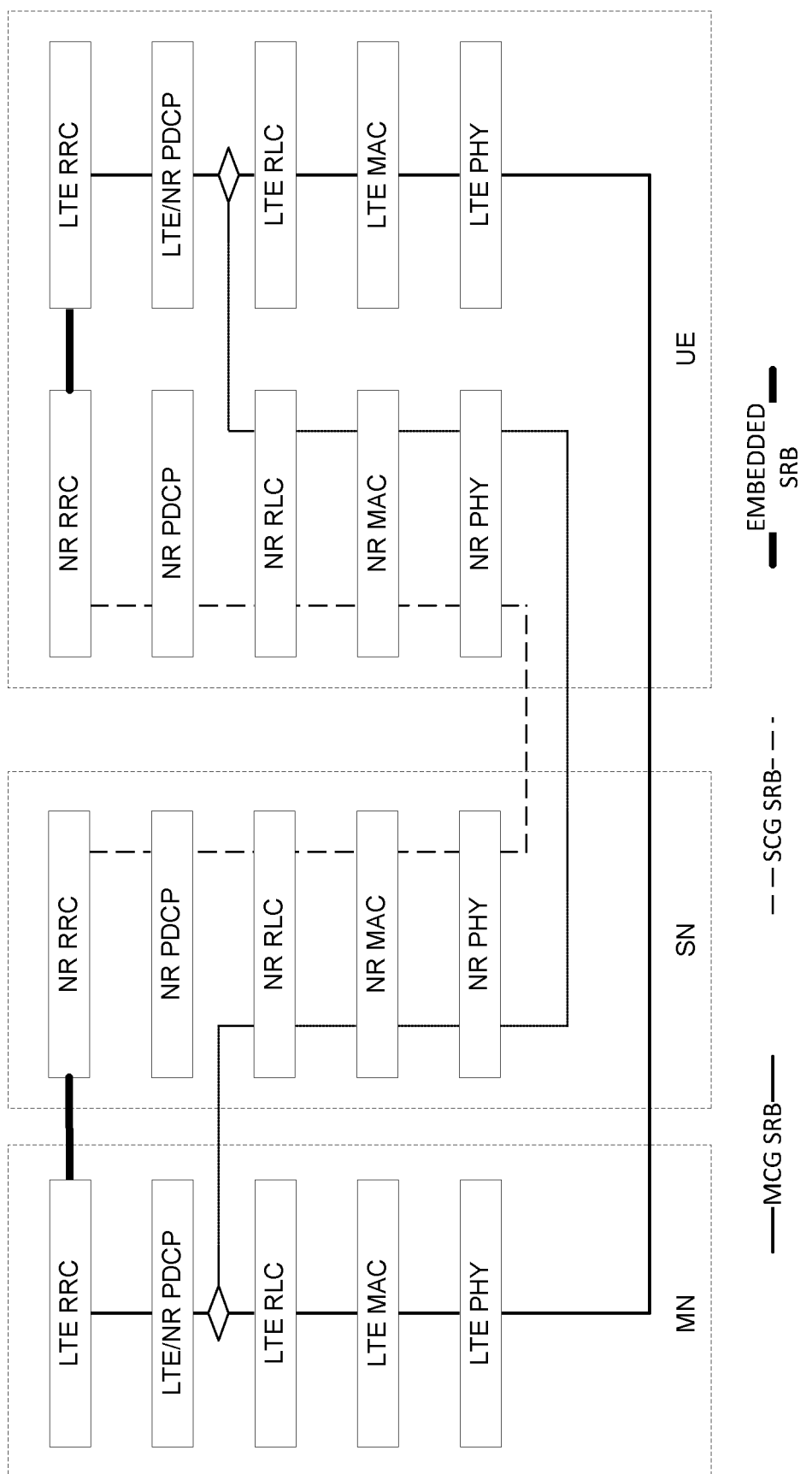

FIGS. 12 and 13 show the UP and Control Plane (CP) architectures for EN-DC according to some embodiments. In particular, FIG. 12 shows network-side protocol termi-nation options for MCG, SCG, and split bearers in MR-DC with EPC (EN-DC). FIG. 13 shows the network architecture for the control plane in EN-DC. Here, the RRC and PDCP layers are higher layers, whereas the RLC, MAC, and PHY layers are lower layers.

Note that the SN is sometimes referred to as SgNB (where gNB is an NR base station), and the MN as MeNB in case the LTE is the master node and NR is the secondary node. In the other case where NR is the master and LTE is the secondary node, the corresponding terms are SeNB and MgNB.

Split RRC messages are mainly used for creating diver-sity, and the sender can decide to either choose one of the links for scheduling the RRC messages, or it can duplicate the message over both links. In the downlink, the path switching between the MCG or SCG legs or duplication on both is left to network implementation. On the other hand, for the UL, the network configures the UE to use the MCG, SCG or both legs. The terms "leg", "path" and "RLC bearer" are used interchangeably herein.

Inter-node RRC messages are RRC messages that are sent either across the X2-, Xn- or the NG-interface, either to or from the gNB, i.e. a single 'logical channel' is used for all RRC messages transferred across network nodes. The infor-mation could originate from or be destined for another RAT.

RRC operation in this regard depends on the UE specific states. A UE is in either RRC_CONNECTED state, RRC_I-NACTIVE state or RRC_IDLE state. The different RRC states have different amounts of radio resources associated with them and that the UE may use in a given specific state. In RRC_INACTIVE and RRC_IDLE state, UE controlled mobility based on network (NW) configuration is adopted, i.e., the UE acquires System Information Block (SIB), performs neighboring cell measurements and cell (re-)se-lection, and monitors a Paging occasion. An inactive UE stores the UE Inactive Access Stratum (AS) context and performs RAN-based notification area (RNA) updates.

In RRC_CONNECTED state, however, network (NW) controlled mobility is performed. In fact, the RAN node can receive paging assistance information related to potential paging triggers, such as QoS flows or signaling, from the 5G core network (CN). The UE is thus known by the NW at node/cell level and UE specific bearer is established upon which UE specific data and/or control signaling could be communicated. For example, the RAN can configure UE-specific RNAs that make it possible to reduce the total signaling load by configuring small RNAs for stationary UEs (optimized for low paging load) and, especially, larger RNAs for moving UEs (optimized for vehicular UEs).

Furthermore, if, e.g., there is no traffic transmission and/or reception for a certain timer period, the network can initiate the RRC connection release procedure to transit a UE in RRC_CONNECTED to RRC_IDLE; or to RRC_INAC-TIVE if SRB2 and at least one DRB is setup in RRC_CO-NNECTED.

Figure 14:
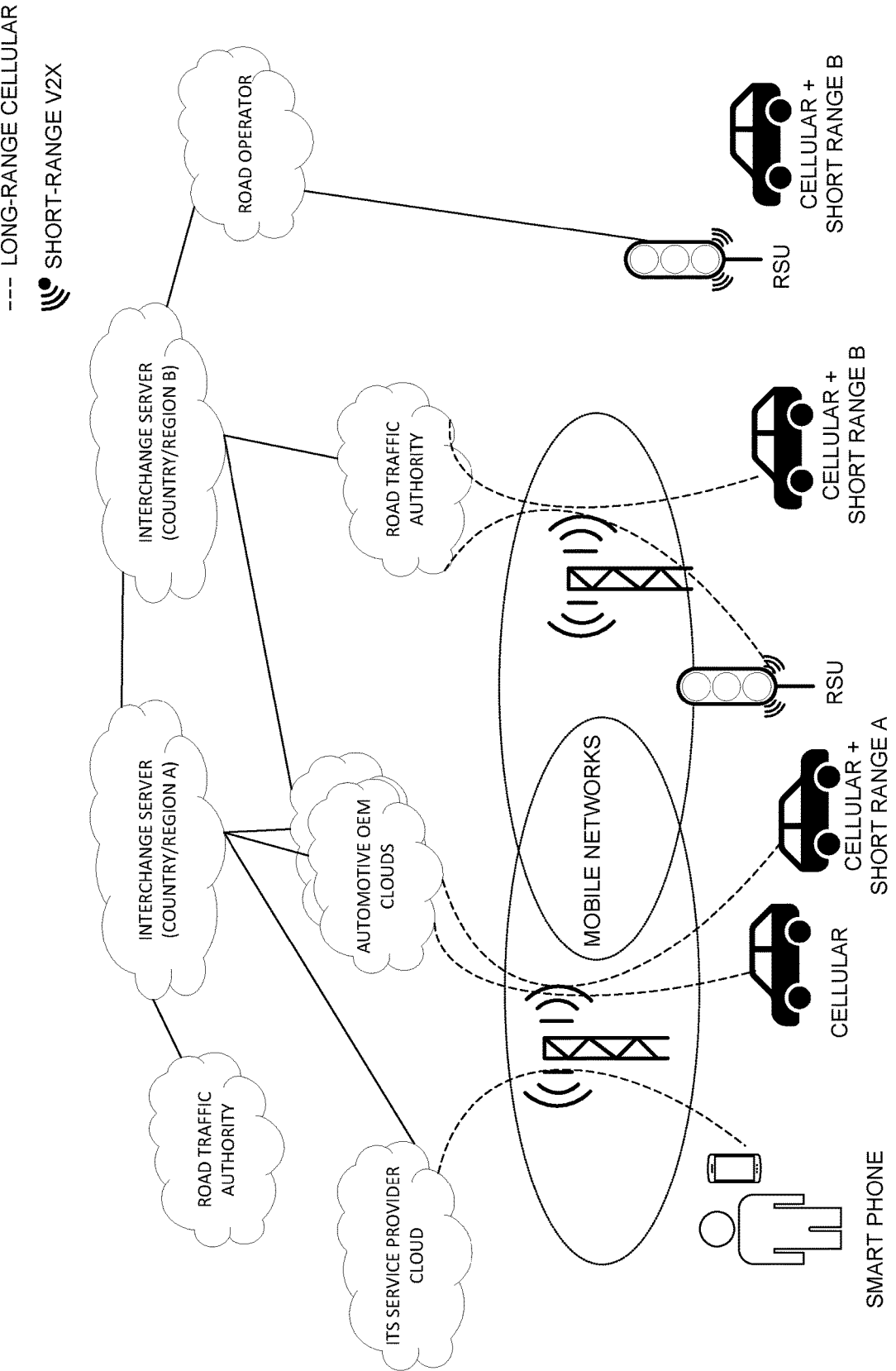
FIG. 14 is a block diagram of a system with short range and long range V2X service transmissions according to some embodiments.

Some embodiments herein are applicable to vehicular communications. Consider for example NR vehicle-to-everything (V2X). Cellular Intelligent Transport Systems (ITS) aim at defining a new cellular eco-system for the delivery of vehicular services and their dissemination. Such eco-system includes both short range and long range V2X service transmissions, as depicted in FIG. 14. In particular, short range communication involves transmissions over the Device-to-Device (D2D) link, also defined as sidelink or PC5 interface in 3GPP, towards other vehicular UEs or road side units (RSU). On the other hand, for long range transmission, it considers the transmission over the Uu interface between a UE and a base station, in which case packets may be disseminated to different ITS service providers, which could be road traffic authorities, road operators, automotive OEMs, cellular operators, etc.

In particular, some embodiments herein are applicable to V2X communication, including any combination of direct communication between vehicles (V2V), pedestrians (V2P) and infrastructure (V2I). While LTE V2X mainly aims at traffic safety services, NR V2X has a much broader scope including not only basic safety services, but also targeting non-safety applications, such as extended sensor/data sharing between vehicles, with the objective to strengthen the perception of the surrounding environment of vehicles. Hence, some embodiments herein may support a new set of applications captured in TR 22.886 v16.2.0, such as advanced driving, vehicles platooning, cooperative maneuver between vehicles and remote driving that require an enhanced NR system and new NR sidelink framework.

In this context, some embodiments are applicable for QoS management of the radio interface including both Uu (i.e. network-to-vehicle UE communication) and sidelink (i.e. vehicle UE-to-vehicle UE communication) used for V2X operations. The QoS management may take into account the different performance requirements of the different V2X services.

In NR, for example, a sidelink (SL) QoS flow model is adopted. At the Non-Access Stratum (NAS) layer, a UE maps one V2X packet into the corresponding SL QoS flow and then maps to a SL radio bearer at the Service Data Adaptation Protocol (SDAP) layer.

Figure 15:
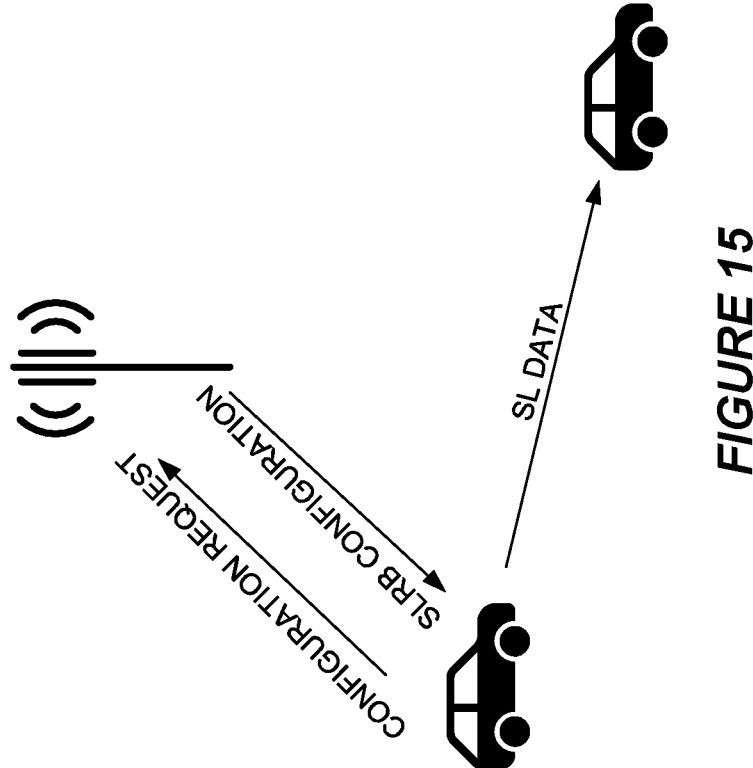
FIG. 15 is a block diagram of a process for sidelink radio bearer configuration according to some embodiments.

In NR, a SL radio bearer (SLRB) configuration, including the QoS flow to SLRB mapping, is either preconfigured or configured by the network (NW) when the UE is in coverage. For instance, as shown in FIG. 15, when a UE wants to establish a new SL QoS flow/SLRB for a new service, it can send a request to the associated gNB. The request can include the QoS information of the service. The gNB then determines appropriate SLRB configuration to support such SL QoS flow. After receiving the SLRB configuration from the gNB, the UE establishes the local SLRB accordingly and prepares for data transmission over the SL. Note that to enable successful reception at the reception (RX) UE side, the transmission (TX) UE might have to inform the RX UE regarding necessary parameters, e.g. sequence number space for PDCP/RLC, before the data transmission starts.

In some embodiments, there are two different resource allocation (RA) procedures for V2X on sidelink, i.e. NW controlled RA (so called "mode 3" in LTE and "mode 1" in NR) and autonomous RA (so called "mode 4" in LTE and "mode 2" in NR). The transmission resources are selected within a resource pool which is predefined or configured by the network (NVV).

With NW controlled RA, NG-RAN is in charge of scheduling SL resource(s) to be used by a UE for SL transmission(s). The UE sends a SL buffer status report (BSR) to the NW to inform about SL data available for transmission in the SL buffers associated with the Medium Access Control (MAC) entity. The NW signals then the resource allocation to the UE using downlink control information (DCI). NW controlled (or Mode-1) resource allocation may be realized via dynamic scheduling signalling via a Physical Downlink Control Channel (PDCCH), or by semi-persistent scheduling in which the gNB provides one or more configured SL grants. Both type-1 and type-2 configured SL grants are supported.

With autonomous RA, each device independently decides which SL radio resources to use for SL operations, based on, e.g., sensing. For both RA modes, sidelink control information (SCI) is transmitted on a physical sidelink control channel (PSCCH) to indicate the assigned sidelink resources for a physical sidelink shared channel (PSSCH). Unlike NW controlled RA, which can only be performed when a UE is in RRC_CONNECTED state, autonomous RA (or Mode-2) can be performed both when the UE is in RRC_CON-NECTED mode and when the UE is in INACTIVE/IDLE state, and also when the UE is under Uu coverage and out-of-coverage. In particular, when the UE is in RRC_CO-NNECTED mode, the SL resource pool can be configured with dedicated RRC signalling, while for IDLE/INACTIVE mode operations, the UE shall rely on the SL resource pool provisioned in broadcasting signal, i.e. SIB.

In some embodiments, a UE under certain conditions, e.g. for groupcast SL communication, is allowed to provision other UEs with a mode-2 pool to be used for SL communication, e.g. for SL communication within a group of UEs, such as a platoon of vehicles.

Configured grant is supported for NR sidelink, for both type 1 and type 2. With configured grant, the gNB can allocate sidelink resources for multiple (periodical) transmissions to the UE. Type 1 configured grant is configured and activated directly via dedicated RRC signaling, and type 2 configured grant is configured via dedicated RRC signaling, but only activated/released via downlink control information (DCI) transmitted on PDCCH.

Some embodiments herein address a challenge that occurs when the sidelink (SL) UEs are under the coverage of two different gNBs; namely, the gNBs could send two different configurations to the SL UEs. One example could be regarding the RLC mode configuration. In case one SL UE is configured to operate with RLC Acknowledged Mode (AM) and the other one with RLC Unacknowledged Mode (UM), then there could be a configuration inconsistency issue. This situation is not linked only to the RLC mode, but it may happen also in those situations where the two SLRB configurations sent to the two SL UEs need some coordination. Moreover, there could be other configuration mismatches that may affect the SL operation.

Certain aspects of the present disclosure and their embodiments may provide solutions to these or other challenges. Some embodiments mitigate or avoid the SL configuration inconsistencies. Some embodiments for example overcome the configuration inconsistency problems for different DC scenarios either by keeping the same logical node as the SL configuring node for a group of SL UEs and/or exchanging information proactively between the different nodes.

Certain embodiments may provide one or more of the following technical advantage(s). Some embodiments aim at avoiding conflicts in the SL configuration of two SL UEs when the SL configuration comes from two different gNBs. This will allow the SL UEs to establish the SL connectivity without any errors and thus avoid configuration failures.

In the following embodiments, UE1 is referred to as the TX (transmitter) UE and UE2 is referred to as the RX (receiver) UE. However, the terms UE1 and UE2 can be exchanged without losing any meaning in what is described. Further, the solutions disclosed in the following are related to two gNBs in DC scenarios, but it may be also applied to non-DC scenario as long as there is an X2/Xn interface between two gNBs (e.g., handover scenarios) or a scenario where one SL UE is configured with DC and the other is not.

Figure 16A:
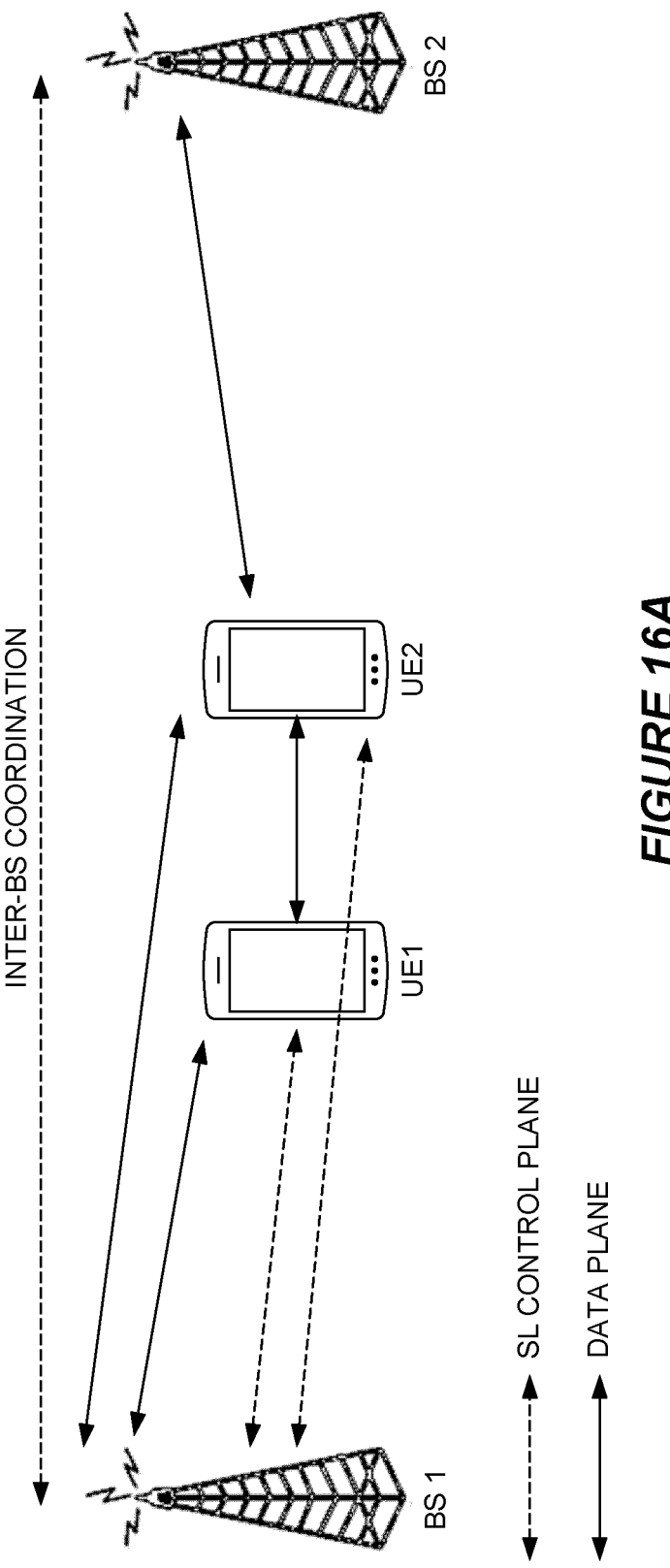
FIG. 16A is a block diagram illustrating centrally controlling sidelink configuration of wireless devices from the same network node according to some embodiments.

Consider first an example of embodiments that centrally control sidelink configuration of the wireless devices 12A, 12B in FIG. 1 from the same network node. FIG. 16A shows one example where UE1 and UE2 are both controlled by BS 1 in terms of SL configuration. For example, if at least one of the SL UEs is configured with dual connectivity (DC), SL configurations are managed by a logical node that is common to the SL UEs. This node could be master node (MN) for one of the SL UEs and master node (MN) or secondary node (SN) or simply the connected single node for the other SL UE even though it is logically the same node. For example, BS 1 may be MN for UE1 and SN for UE2. Regardless, this means that when the SL is set up, the SL configuring RRC entities should be located at the same logical node and this (i.e., SL controlling RRC entity information) may be (optionally) indicated to at least one of the SL UEs e.g., when SN is to control/generate/configure SL configurations.

In a further embodiment, the layer 2 (L2) IDs (source or destination ID) of the SL UEs that are requesting to have SL communication/transmission and/or SL configurations (or any other IDs that could identify these UEs, such as International Mobile Subscriber Identity (IMSI), the combination of Physical Cell Identities (PCI(s)) and Cell Radio Network Temporary Identities (C-RNTI(s))) are used and/or in some embodiments exchanged between nodes in order to identify SL UEs and/or control/generate SL configurations. The UE identifiers for one or more UEs can be indicated in the SL request or in another message from UE to the network node. Also, the network node may get the UE identifier information from a core network node/database (e.g., a third network node, not another base station).

In some embodiments it could be such that the node (either MN or SN) receiving the SL request (i.e., SL connection/transmission set up related message) could make the decision whether to generate SL configuration or not; and/or initiate the inter-node coordination regarding the SL configuration.

In some embodiments, the node (e.g., MN of UE 1)—receiving the request from one of the UEs (e.g., UE 1) regarding SL configuration or connection—makes the decision. In some embodiments, this node could be the node where the other SL UE (e.g., UE 2) is connected to or at least in inactive or dormant state within. The decision could be to generate the SL configurations using the already available RRC entities located at the same logical node. This logical node could be the node that received the SL request or another node. In some embodiments, when the decision is made, the other node(s) are informed by using an inter-node message. In a further embodiment, the other node(s) could be identified based on the UE identifier/cell identifier received in the SL request message and/or with the help of a database available within the same or a third node. In some embodiments, if the SL configuration(s) for one (or more) UE(s) is (decided) to be generated by another node, then the SL configuration message can be inquired/requested and fetched/received by the node that received the SL request message. After receiving the (fetched) configuration, the SL configuration can be encapsulated within an RRC message of the node that received the SL request message.

In some embodiments, the decision takes place after the inter-node coordination such that the node (e.g., SN of UE 2) receiving the request from one of the UEs (e.g., UE 2) regarding SL configuration/connection inquires which node should generate the SL configuration for the SL UEs (e.g., UE1 and UE 2) with the other node (e.g., this node could be MN/SN of UE 1 and MN of UE2 at the same time). Inquiry could be based on/include the UE identifier(s) received and inquiry message may be responded by a message (from the inquired node) regarding which logical node will control/generate SL configuration(s) for one of the UEs (e.g., UE 2) or both UEs. In some embodiments, the inquiry message could include the SL request message received from the SL UE (e.g., UE2). In some embodiments, the inquiry response message may already include the generated SL configuration which can be encapsulated with another node's RRC message.

In a further embodiment, this indication (i.e., which logical node is controlling/generating the SL configurations) can be sent via an RRC reconfiguration message. The indication could be explicit or implicit. In case of the implicit indication, SL configuration is e.g., generated by the SN and that means SN is of the controlling RRC entity of the SL configurations. It should be noted that while the respective logical node is SN for one of the SL UEs in this example, it could be MN for the other SL UE. If there is no explicit and implicit indication, it may not be visible to the UE who generated the configuration even though in the background the configuration is decided and/or generated by the same logical node. In case of implicit indication, the decision of generating SL configurations in the same logical node could be visible because even if the configurations are conveyed by different nodes using different signaling radio bearers (SRBs), at least one of the UEs may receive the configuration in a RRC information element or a RRC PDU/message that is encapsulated/embedded in another RRC message.

In a further embodiment, when the logical node needs to be changed due to setting up the DC (i.e., MN/SN is modified/changed or SN is added), the SL UEs could also be reconfigured with the new SL controlling RRC entity information.

In a further embodiment, the logical node could refer to central unit (CU) in some architecture options (i.e., gNB CU/DU split architecture). Yet, in another embodiment, the logical node could refer to the distributed unit (DU) in some architecture options (i.e., gNB CU/DU split architecture).

Figure 16B:
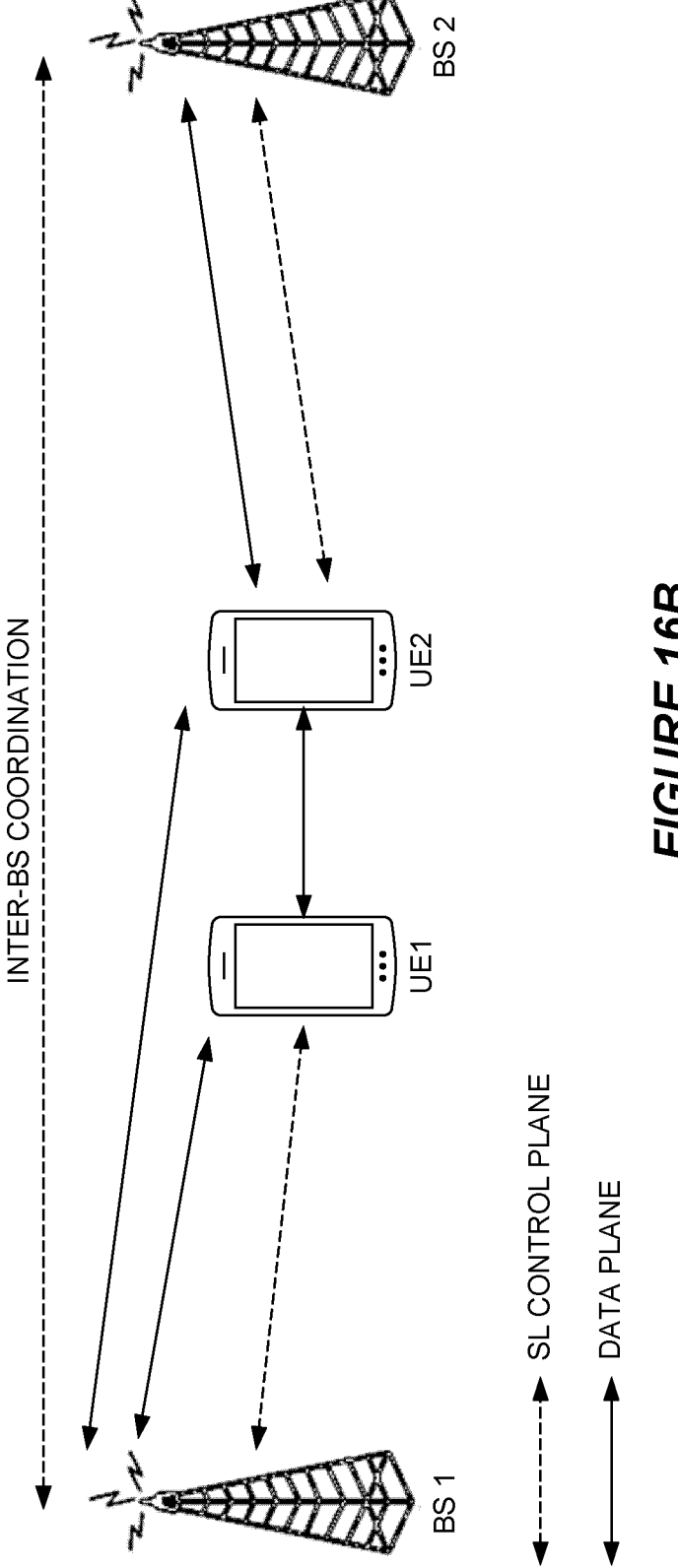
FIG. 16B is a block diagram illustrating coordination between wireless devices regarding sidelink configurations to be used according to some embodiments.

Consider next an example of embodiments where the respective wireless devise 12A, 12B in FIG. 1 coordinate 22 with one another regarding the sidelink configurations 16A, 16B to be used. FIG. 16B shows one such example. In FIG. 16B, instead of selecting a common logical node for controlling/generating SL configurations, the nodes exchange information regarding what SL configuration can be used as described in the further embodiments below (focusing on DC modification/change/addition procedures). Here, not to be confused with the previous embodiments, MN and SN could be different nodes and could be serving at least one of the SL UEs simultaneously. In FIG. 16B, for example, UE1 and UE2 are controlled by BS 1 and BS respectively, in terms of SL configuration. BS1 may be MN for both UE 1 and UE 2, and BS 2 may be SN for both UEs.

In one of the embodiments, a standalone gNB (i.e., the MN) when adding the SN, MN shares with SN the SL configurations that it is planning to use for configuring SL UEs. In another embodiment, a standalone gNB (i.e., the MN) when adding the SN, MN sends to the SN the SL configurations that the SN should use for configuring possible SL UEs or other way around i.e., from SN to MN.

In another embodiment, the coordination for the SL configurations between the MN and SN happens during the SN addition procedure. Yet, in one embodiment, the coordination for the SL configurations between the MN and SN happens during the SN modification procedure. In another embodiment, the coordination for the SL configurations between the MN and SN happens during the SN change procedure. Further, in one of the embodiments, the coordination for the SL configurations between the MN and SN happens during intra-RAT or inter-RAT handover procedure.

In another embodiment, a SL configuration refers to the logical channel ID (LCID) to RLC mode mapping that will be used (e.g., LCID 1→RLC AM, LCID 2→RLC UM, and so on). Yet, in another embodiment, the SL configuration refers to the full set of the SLRB configuration that the MN want to configure for the SL UEs. In another embodiment, the SL configuration refers to default parameters used for configuring SL UEs under the MN or SN coverage (e.g., RLC mode, PDCP-duplication on/off, SDAP header present/absent, and so on).

In one embodiment, once receiving the SL configuration from the MN, the SN stores it and uses it once a new SL UE needs to be configured.

In another embodiment, once receiving the SL configuration from the MN, the SN sends back to the MN a set of SL parameters/configurations that would be acceptable for configuring possible SL UEs (i.e., in case the configuration received by the MN are not applicable on the SN). Yet, in another embodiment, once receiving the SL configuration from the MN, the SN sends an acknowledgement that the configuration received are accepted/rejected.

Figure 16C:
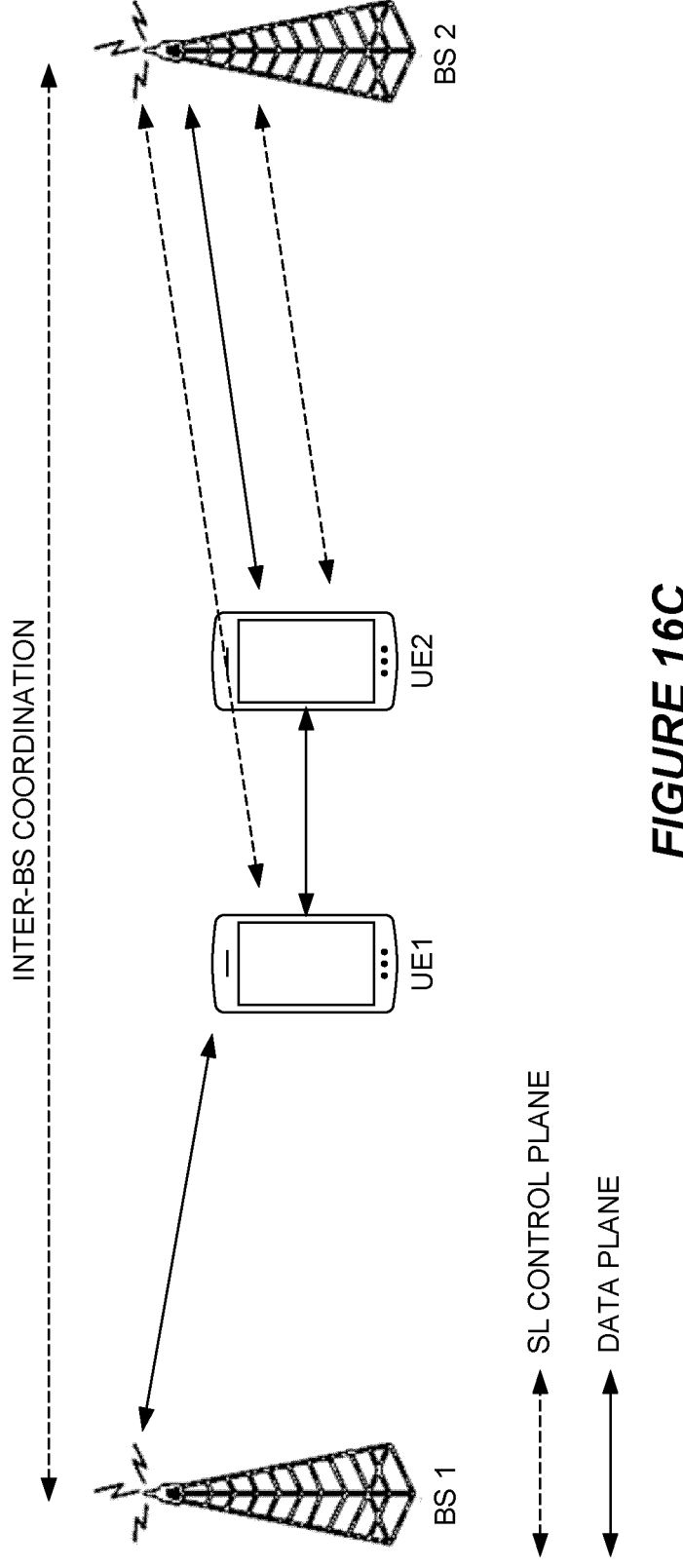
FIG. 16C is a block diagram illustrating selection by a wireless device of a sidelink configuration that is consistent with or compatible with that of another wireless device according to some embodiments.

Consider next an example of embodiments where a wireless device 12A receives different prospective sidelink configurations from different respective network nodes and selects whichever of the sidelink configurations is consistent with or compatible with the sidelink configuration 16B of the wireless device 12B with which sidelink communication is to be performed. FIG. 16C shows one such example, e.g., where UE1 and UE2 are controlled by BS 2 in terms of SL configuration, and BS 1 is either MN or SN for UE1, and UE2 is connected to a single node (BS2). If one of the two SL UEs is under the coverage of two gNBs (i.e., MN and SN of that respective SL UE), it asks for a SL configuration from both gNBs and then selects the one that is compliant to that one of the peer UE. In another embodiment, after receiving the SL configurations from the two gNBs, the UE sends an acknowledgment to the two gNBs (or at least one of them) by saying if the received SL configuration is used or not (accept or reject of the received SL configuration).

In one of the embodiments, upon receiving the request of a SL configuration from the UE, the NG-RAN node (e.g., the MN or SN) includes in the sidelink configuration the source and destination L2 IDs to which the same SL configuration has been already sent. This will help the UE to understand if its peer UE is using a similar SL configuration or not.

Figure 17:
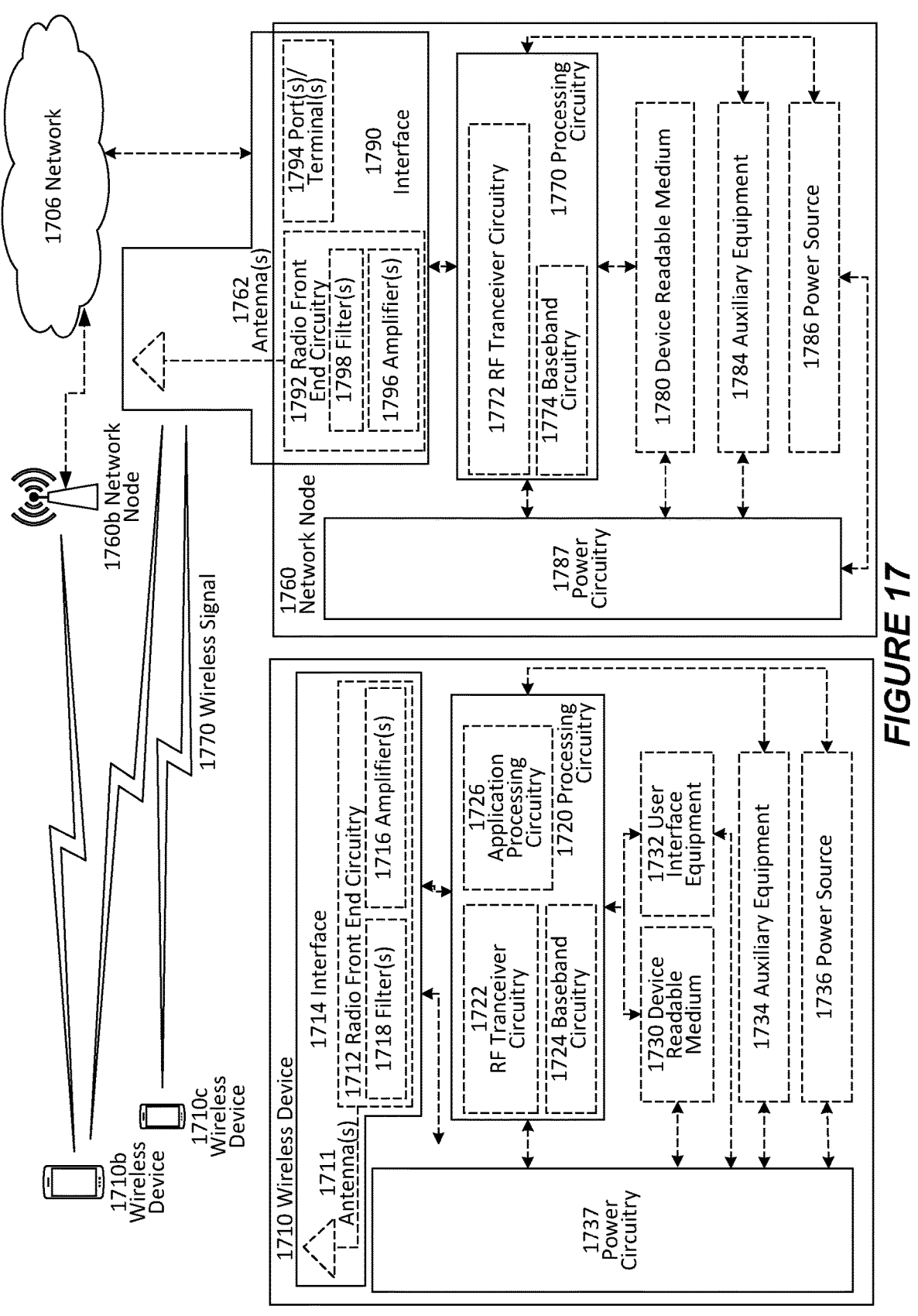
FIG. 17 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 17. For simplicity, the wireless network of FIG. 17 only depicts network 1706, network nodes 1760 and 1760b, and WDs 1710, 1710b, and 1710c. In practice, a wireless network may further include any additional elements suitable to support communication between wireless devices or between a wireless device and another communication device, such as a landline telephone, a service provider, or any other network node or end device. Of the illustrated components, network node 1760 and wireless device (WD) 1710 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1760 and WD 1710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 17, network node 1760 includes processing circuitry 1770, device readable medium 1780, interface 1790, auxiliary equipment 1784, power source 1786, power circuitry 1787, and antenna 1762. Although network node 1760 illustrated in the example wireless network of FIG. 17 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1760 are depicted as single boxes located within a larger box, or nested within multiple boxes, in practice, a network node may comprise multiple different physical components that make up a single illustrated component (e.g., device readable medium 1780 may comprise multiple separate hard drives as well as multiple RAM modules).

Similarly, network node 1760 may be composed of multiple physically separate components (e.g., a NodeB component and a RNC component, or a BTS component and a BSC component, etc.), which may each have their own respective components. In certain scenarios in which network node 1760 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1760 may be configured to support multiple radio access technologies (RATs). In such embodiments, some components may be duplicated (e.g., separate device readable medium 1780 for the different RATs) and some components may be reused (e.g., the same antenna 1762 may be shared by the RATs). Network node 1760 may also include multiple sets of the various illustrated components for different wireless technologies integrated into network node 1760, such as, for example, GSM, WCDMA, LTE, NR, WiFi, or Bluetooth wireless technologies. These wireless technologies may be integrated into the same or different chip or set of chips and other components within network node 1760.

Processing circuitry 1770 is configured to perform any determining, calculating, or similar operations (e.g., certain obtaining operations) described herein as being provided by a network node. These operations performed by processing circuitry 1770 may include processing information obtained by processing circuitry 1770 by, for example, converting the obtained information into other information, comparing the obtained information or converted information to information stored in the network node, and/or performing one or more operations based on the obtained information or converted information, and as a result of said processing making a determination.

Processing circuitry 1770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1760 components, such as device readable medium 1780, network node 1760 functionality. For example, processing circuitry 1770 may execute instructions stored in device readable medium 1780 or in memory within processing circuitry 1770. Such functionality may include providing any of the various wireless features, functions, or benefits discussed herein. In some embodiments, processing circuitry 1770 may include a system on a chip (SOC).

In some embodiments, processing circuitry 1770 may include one or more of radio frequency (RF) transceiver circuitry 1772 and baseband processing circuitry 1774. In some embodiments, radio frequency (RF) transceiver circuitry 1772 and baseband processing circuitry 1774 may be on separate chips (or sets of chips), boards, or units, such as radio units and digital units. In alternative embodiments, part or all of RF transceiver circuitry 1772 and baseband processing circuitry 1774 may be on the same chip or set of chips, boards, or units In certain embodiments, some or all of the functionality described herein as being provided by a network node, base station, eNB or other such network device may be performed by processing circuitry 1770 executing instructions stored on device readable medium 1780 or memory within processing circuitry 1770. In alternative embodiments, some or all of the functionality may be provided by processing circuitry 1770 without executing instructions stored on a separate or discrete device readable medium, such as in a hard-wired manner. In any of those embodiments, whether executing instructions stored on a device readable storage medium or not, processing circuitry 1770 can be configured to perform the described functionality. The benefits provided by such functionality are not limited to processing circuitry 1770 alone or to other components of network node 1760, but are enjoyed by network node 1760 as a whole, and/or by end users and the wireless network generally.

Device readable medium 1780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1770. Device readable medium 1780 may store any suitable instructions, data or information, including a computer program, software, an application including one or more of logic, rules, code, tables, etc. and/or other instructions capable of being executed by processing circuitry 1770 and, utilized by network node 1760. Device readable medium 1780 may be used to store any calculations made by processing circuitry 1770 and/or any data received via interface 1790. In some embodiments, processing circuitry 1770 and device readable medium 1780 may be considered to be integrated.

Interface 1790 is used in the wired or wireless communication of signalling and/or data between network node 1760, network 1706, and/or WDs 1710. As illustrated, interface 1790 comprises port(s)/terminal(s) 1794 to send and receive data, for example to and from network 1706 over a wired connection. Interface 1790 also includes radio front end circuitry 1792 that may be coupled to, or in certain embodiments a part of, antenna 1762. Radio front end circuitry 1792 comprises filters 1798 and amplifiers 1796. Radio front end circuitry 1792 may be connected to antenna 1762 and processing circuitry 1770. Radio front end circuitry may be configured to condition signals communicated between antenna 1762 and processing circuitry 1770. Radio front end circuitry 1792 may receive digital data that is to be sent out to other network nodes or WDs via a wireless connection. Radio front end circuitry 1792 may convert the digital data into a radio signal having the appropriate channel and bandwidth parameters using a combination of filters 1798 and/or amplifiers 1796. The radio signal may then be transmitted via antenna 1762. Similarly, when receiving data, antenna 1762 may collect radio signals which are then converted into digital data by radio front end circuitry 1792. The digital data may be passed to processing circuitry 1770. In other embodiments, the interface may comprise different components and/or different combinations of components.

In certain alternative embodiments, network node 1760 may not include separate radio front end circuitry 1792, instead, processing circuitry 1770 may comprise radio front end circuitry and may be connected to antenna 1762 without separate radio front end circuitry 1792. Similarly, in some embodiments, all or some of RF transceiver circuitry 1772 may be considered a part of interface 1790. In still other embodiments, interface 1790 may include one or more ports or terminals 1794, radio front end circuitry 1792, and RF transceiver circuitry 1772, as part of a radio unit (not shown), and interface 1790 may communicate with baseband processing circuitry 1774, which is part of a digital unit (not shown).

Antenna 1762 may include one or more antennas, or antenna arrays, configured to send and/or receive wireless signals. Antenna 1762 may be coupled to radio front end circuitry 1790 and may be any type of antenna capable of transmitting and receiving data and/or signals wirelessly. In some embodiments, antenna 1762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1762 may be separate from network node 1760 and may be connectable to network node 1760 through an interface or port.

Antenna 1762, interface 1790, and/or processing circuitry 1770 may be configured to perform any receiving operations and/or certain obtaining operations described herein as being performed by a network node. Any information, data and/or signals may be received from a wireless device, another network node and/or any other network equipment. Similarly, antenna 1762, interface 1790, and/or processing circuitry 1770 may be configured to perform any transmitting operations described herein as being performed by a network node. Any information, data and/or signals may be transmitted to a wireless device, another network node and/or any other network equipment.

Power circuitry 1787 may comprise, or be coupled to, power management circuitry and is configured to supply the components of network node 1760 with power for performing the functionality described herein. Power circuitry 1787 may receive power from power source 1786. Power source 1786 and/or power circuitry 1787 may be configured to provide power to the various components of network node 1760 in a form suitable for the respective components (e.g., at a voltage and current level needed for each respective component). Power source 1786 may either be included in, or external to, power circuitry 1787 and/or network node 1760. For example, network node 1760 may be connectable to an external power source (e.g., an electricity outlet) via an input circuitry or interface such as an electrical cable, whereby the external power source supplies power to power circuitry 1787. As a further example, power source 1786 may comprise a source of power in the form of a battery or battery pack which is connected to, or integrated in, power circuitry 1787. The battery may provide backup power should the external power source fail. Other types of power sources, such as photovoltaic devices, may also be used.

Alternative embodiments of network node 1760 may include additional components beyond those shown in FIG. 17 that may be responsible for providing certain aspects of the network node's functionality, including any of the functionality described herein and/or any functionality necessary to support the subject matter described herein. For example, network node 1760 may include user interface equipment to allow input of information into network node 1760 and to allow output of information from network node 1760. This may allow a user to perform diagnostic, maintenance, repair, and other administrative functions for network node 1760.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1710 includes antenna 1711, interface 1714, processing circuitry 1720, device readable medium 1730, user interface equipment 1732, auxiliary equipment 1734, power source 1736 and power circuitry 1737. WD 1710 may include multiple sets of one or more of the illustrated components for different wireless technologies supported by WD 1710, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1710.

Antenna 1711 may include one or more antennas or antenna arrays, configured to send and/or receive wireless signals, and is connected to interface 1714. In certain alternative embodiments, antenna 1711 may be separate from WD 1710 and be connectable to WD 1710 through an interface or port. Antenna 1711, interface 1714, and/or processing circuitry 1720 may be configured to perform any receiving or transmitting operations described herein as being performed by a WD. Any information, data and/or signals may be received from a network node and/or another WD. In some embodiments, radio front end circuitry and/or antenna 1711 may be considered an interface.

As illustrated, interface 1714 comprises radio front end circuitry 1712 and antenna 1711. Radio front end circuitry 1712 comprise one or more filters 1718 and amplifiers 1716. Radio front end circuitry 1714 is connected to antenna 1711 and processing circuitry 1720, and is configured to condition signals communicated between antenna 1711 and processing circuitry 1720. Radio front end circuitry 1712 may be coupled to or a part of antenna 1711. In some embodiments, WD 1710 may not include separate radio front end circuitry 1712; rather, processing circuitry 1720 may comprise radio front end circuitry and may be connected to antenna 1711. Similarly, in some embodiments, some or all of RF transceiver circuitry 1722 may be considered a part of interface 1714. Radio front end circuitry 1712 may receive digital data that is to be sent out to other network nodes or WDs via a wireless connection. Radio front end circuitry 1712 may convert the digital data into a radio signal having the appropriate channel and bandwidth parameters using a combination of filters 1718 and/or amplifiers 1716. The radio signal may then be transmitted via antenna 1711. Similarly, when receiving data, antenna 1711 may collect radio signals which are then converted into digital data by radio front end circuitry 1712. The digital data may be passed to processing circuitry 1720. In other embodiments, the interface may comprise different components and/or different combinations of components.

Processing circuitry 1720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1710 components, such as device readable medium 1730, WD 1710 functionality. Such functionality may include providing any of the various wireless features or benefits discussed herein. For example, processing circuitry 1720 may execute instructions stored in device readable medium 1730 or in memory within processing circuitry 1720 to provide the functionality disclosed herein.

As illustrated, processing circuitry 1720 includes one or more of RF transceiver circuitry 1722, baseband processing circuitry 1724, and application processing circuitry 1726. In other embodiments, the processing circuitry may comprise different components and/or different combinations of components. In certain embodiments processing circuitry 1720 of WD 1710 may comprise a SOC. In some embodiments, RF transceiver circuitry 1722, baseband processing circuitry 1724, and application processing circuitry 1726 may be on separate chips or sets of chips. In alternative embodiments, part or all of baseband processing circuitry 1724 and application processing circuitry 1726 may be combined into one chip or set of chips, and RF transceiver circuitry 1722 may be on a separate chip or set of chips. In still alternative embodiments, part or all of RF transceiver circuitry 1722 and baseband processing circuitry 1724 may be on the same chip or set of chips, and application processing circuitry 1726 may be on a separate chip or set of chips. In yet other alternative embodiments, part or all of RF transceiver circuitry 1722, baseband processing circuitry 1724, and application processing circuitry 1726 may be combined in the same chip or set of chips. In some embodiments, RF transceiver circuitry 1722 may be a part of interface 1714. RF transceiver circuitry 1722 may condition RF signals for processing circuitry 1720.

In certain embodiments, some or all of the functionality described herein as being performed by a WD may be provided by processing circuitry 1720 executing instructions stored on device readable medium 1730, which in certain embodiments may be a computer-readable storage medium. In alternative embodiments, some or all of the functionality may be provided by processing circuitry 1720 without executing instructions stored on a separate or discrete device readable storage medium, such as in a hard-wired manner. In any of those particular embodiments, whether executing instructions stored on a device readable storage medium or not, processing circuitry 1720 can be configured to perform the described functionality. The benefits provided by such functionality are not limited to processing circuitry 1720 alone or to other components of WD 1710, but are enjoyed by WD 1710 as a whole, and/or by end users and the wireless network generally.

Processing circuitry 1720 may be configured to perform any determining, calculating, or similar operations (e.g., certain obtaining operations) described herein as being performed by a WD. These operations, as performed by processing circuitry 1720, may include processing information obtained by processing circuitry 1720 by, for example, converting the obtained information into other information, comparing the obtained information or converted information to information stored by WD 1710, and/or performing one or more operations based on the obtained information or converted information, and as a result of said processing making a determination.

Device readable medium 1730 may be operable to store a computer program, software, an application including one or more of logic, rules, code, tables, etc. and/or other instructions capable of being executed by processing circuitry 1720. Device readable medium 1730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1720. In some embodiments, processing circuitry 1720 and device readable medium 1730 may be considered to be integrated.

User interface equipment 1732 may provide components that allow for a human user to interact with WD 1710. Such interaction may be of many forms, such as visual, audial, tactile, etc. User interface equipment 1732 may be operable to produce output to the user and to allow the user to provide input to WD 1710. The type of interaction may vary depending on the type of user interface equipment 1732 installed in WD 1710. For example, if WD 1710 is a smart phone, the interaction may be via a touch screen; if WD 1710 is a smart meter, the interaction may be through a screen that provides usage (e.g., the number of gallons used) or a speaker that provides an audible alert (e.g., if smoke is detected). User interface equipment 1732 may include input interfaces, devices and circuits, and output interfaces, devices and circuits. User interface equipment 1732 is configured to allow input of information into WD 1710, and is connected to processing circuitry 1720 to allow processing circuitry 1720 to process the input information. User interface equipment 1732 may include, for example, a microphone, a proximity or other sensor, keys/buttons, a touch display, one or more cameras, a USB port, or other input circuitry. User interface equipment 1732 is also configured to allow output of information from WD 1710, and to allow processing circuitry 1720 to output information from WD 1710. User interface equipment 1732 may include, for example, a speaker, a display, vibrating circuitry, a USB port, a headphone interface, or other output circuitry. Using one or more input and output interfaces, devices, and circuits, of user interface equipment 1732, WD 1710 may communicate with end users and/or the wireless network, and allow them to benefit from the functionality described herein.

Auxiliary equipment 1734 is operable to provide more specific functionality which may not be generally performed by WDs. This may comprise specialized sensors for doing measurements for various purposes, interfaces for additional types of communication such as wired communications etc. The inclusion and type of components of auxiliary equipment 1734 may vary depending on the embodiment and/or scenario.

Power source 1736 may, in some embodiments, be in the form of a battery or battery pack. Other types of power sources, such as an external power source (e.g., an electricity outlet), photovoltaic devices or power cells, may also be used. WD 1710 may further comprise power circuitry 1737 for delivering power from power source 1736 to the various parts of WD 1710 which need power from power source

1736 to carry out any functionality described or indicated herein. Power circuitry 1737 may in certain embodiments comprise power management circuitry. Power circuitry 1737 may additionally or alternatively be operable to receive power from an external power source; in which case WD 1710 may be connectable to the external power source (such as an electricity outlet) via input circuitry or an interface such as an electrical power cable. Power circuitry 1737 may also in certain embodiments be operable to deliver power from an external power source to power source 1736. This may be, for example, for the charging of power source 1736. Power circuitry 1737 may perform any formatting, converting, or other modification to the power from power source 1736 to make the power suitable for the respective components of WD 1710 to which power is supplied.

Figure 18:
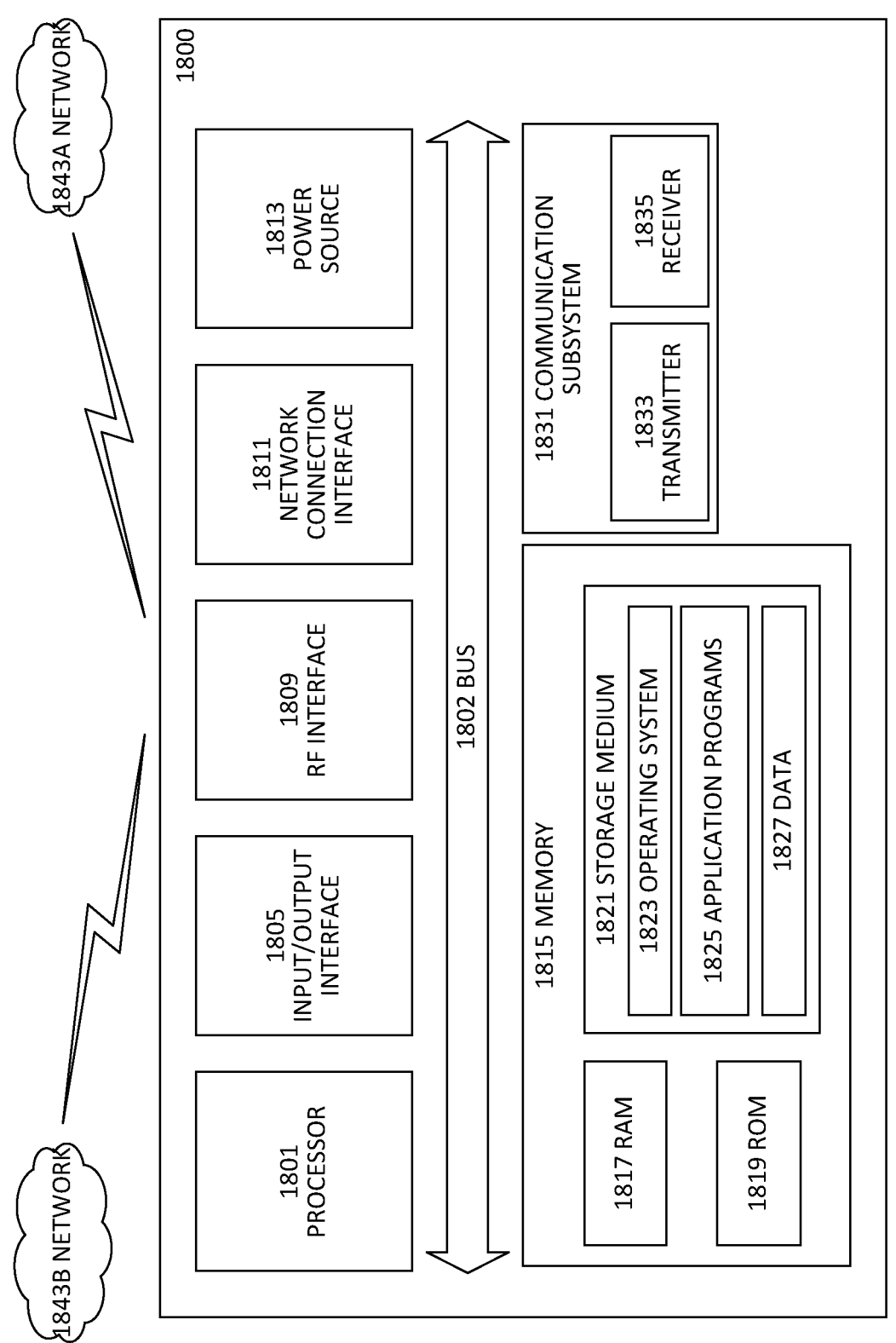
FIG. 18 is a block diagram of a user equipment according to some embodiments.

FIG. 18 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 18200 may be any UE identified by the $3^{rd}$ Generation Partnership Project (3GPP), including a NB-IoT UE, a machine type communication (MTC) UE, and/or an enhanced MTC (eMTC) UE. UE 1800, as illustrated in FIG. 18, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 18 is a UE, the components discussed herein are equally applicable to a WD, and vice-versa.

In FIG. 18, UE 1800 includes processing circuitry 1801 that is operatively coupled to input/output interface 1805, radio frequency (RF) interface 1809, network connection interface 1811, memory 1815 including random access memory (RAM) 1817, read-only memory (ROM) 1819, and storage medium 1821 or the like, communication subsystem 1831, power source 1833, and/or any other component, or any combination thereof. Storage medium 1821 includes operating system 1823, application program 1825, and data 1827. In other embodiments, storage medium 1821 may include other similar types of information. Certain UEs may utilize all of the components shown in FIG. 18, or only a subset of the components. The level of integration between the components may vary from one UE to another UE. Further, certain UEs may contain multiple instances of a component, such as multiple processors, memories, transceivers, transmitters, receivers, etc.

In FIG. 18, processing circuitry 1801 may be configured to process computer instructions and data. Processing circuitry 1801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1801 may include two central processing units (CPUs). Data may be information in a form suitable for use by a computer.

In the depicted embodiment, input/output interface 1805 may be configured to provide a communication interface to an input device, output device, or input and output device. UE 1800 may be configured to use an output device via input/output interface 1805. An output device may use the same type of interface port as an input device. For example, a USB port may be used to provide input to and output from UE 1800. The output device may be a speaker, a sound card, a video card, a display, a monitor, a printer, an actuator, an emitter, a smartcard, another output device, or any combination thereof. UE 1800 may be configured to use an input device via input/output interface 1805 to allow a user to capture information into UE 1800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 18, RF interface 1809 may be configured to provide a communication interface to RF components such as a transmitter, a receiver, and an antenna. Network connection interface 1811 may be configured to provide a communication interface to network 1843a. Network 1843a may encompass wired and/or wireless networks such as a local-area network (LAN), a wide-area network (WAN), a computer network, a wireless network, a telecommunications network, another like network or any combination thereof. For example, network 1843a may comprise a Wi-Fi network. Network connection interface 1811 may be configured to include a receiver and a transmitter interface used to communicate with one or more other devices over a communication network according to one or more communication protocols, such as Ethernet, TCP/IP, SONET, ATM, or the like. Network connection interface 1811 may implement receiver and transmitter functionality appropriate to the communication network links (e.g., optical, electrical, and the like). The transmitter and receiver functions may share circuit components, software or firmware, or alternatively may be implemented separately.

RAM 1817 may be configured to interface via bus 1802 to processing circuitry 1801 to provide storage or caching of data or computer instructions during the execution of software programs such as the operating system, application programs, and device drivers. ROM 1819 may be configured to provide computer instructions or data to processing circuitry 1801. For example, ROM 1819 may be configured to store invariant low-level system code or data for basic system functions such as basic input and output (I/O), startup, or reception of keystrokes from a keyboard that are stored in a non-volatile memory. Storage medium 1821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1821 may be configured to include operating system 1823, application program 1825 such as a web browser application, a widget or gadget engine or another application, and data file 1827. Storage medium 1821 may store, for use by UE 1800, any of a variety of various operating systems or combinations of operating systems.

Storage medium 1821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1821 may allow UE 1800 to access computer-executable instructions, application programs or the like, stored on transitory or non-transitory memory media, to off-load data, or to upload data. An article of manufacture, such as one utilizing a communication system may be tangibly embodied in storage medium 1821, which may comprise a device readable medium.

In FIG. 18, processing circuitry 1801 may be configured to communicate with network 1843b using communication subsystem 1831. Network 1843a and network 1843b may be the same network or networks or different network or networks. Communication subsystem 1831 may be configured to include one or more transceivers used to communicate with network 1843b. For example, communication subsystem 1831 may be configured to include one or more transceivers used to communicate with one or more remote transceivers of another device capable of wireless communication such as another WD, UE, or base station of a radio access network (RAN) according to one or more communication protocols, such as IEEE 802.18, CDMA, WCDMA, GSM, LTE, UTRAN, WiMax, or the like. Each transceiver may include transmitter 1833 and/or receiver 1835 to implement transmitter or receiver functionality, respectively, appropriate to the RAN links (e.g., frequency allocations and the like). Further, transmitter 1833 and receiver 1835 of each transceiver may share circuit components, software or firmware, or alternatively may be implemented separately.

In the illustrated embodiment, the communication functions of communication subsystem 1831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1831 may include cellular communication, Wi-Fi communication, Bluetooth communication, and GPS communication. Network 1843b may encompass wired and/or wireless networks such as a local-area network (LAN), a wide-area network (WAN), a computer network, a wireless network, a telecommunications network, another like network or any combination thereof. For example, network 1843b may be a cellular network, a Wi-Fi network, and/or a near-field network. Power source 1813 may be configured to provide alternating current (AC) or direct current (DC) power to components of UE 1800.

The features, benefits and/or functions described herein may be implemented in one of the components of UE 1800 or partitioned across multiple components of UE 1800. Further, the features, benefits, and/or functions described herein may be implemented in any combination of hardware, software or firmware. In one example, communication subsystem 1831 may be configured to include any of the components described herein. Further, processing circuitry 1801 may be configured to communicate with any of such components over bus 1802. In another example, any of such components may be represented by program instructions stored in memory that when executed by processing circuitry 1801 perform the corresponding functions described herein. In another example, the functionality of any of such components may be partitioned between processing circuitry 1801 and communication subsystem 1831. In another example, the non-computationally intensive functions of any of such components may be implemented in software or firmware and the computationally intensive functions may be implemented in hardware.

Figure 19:
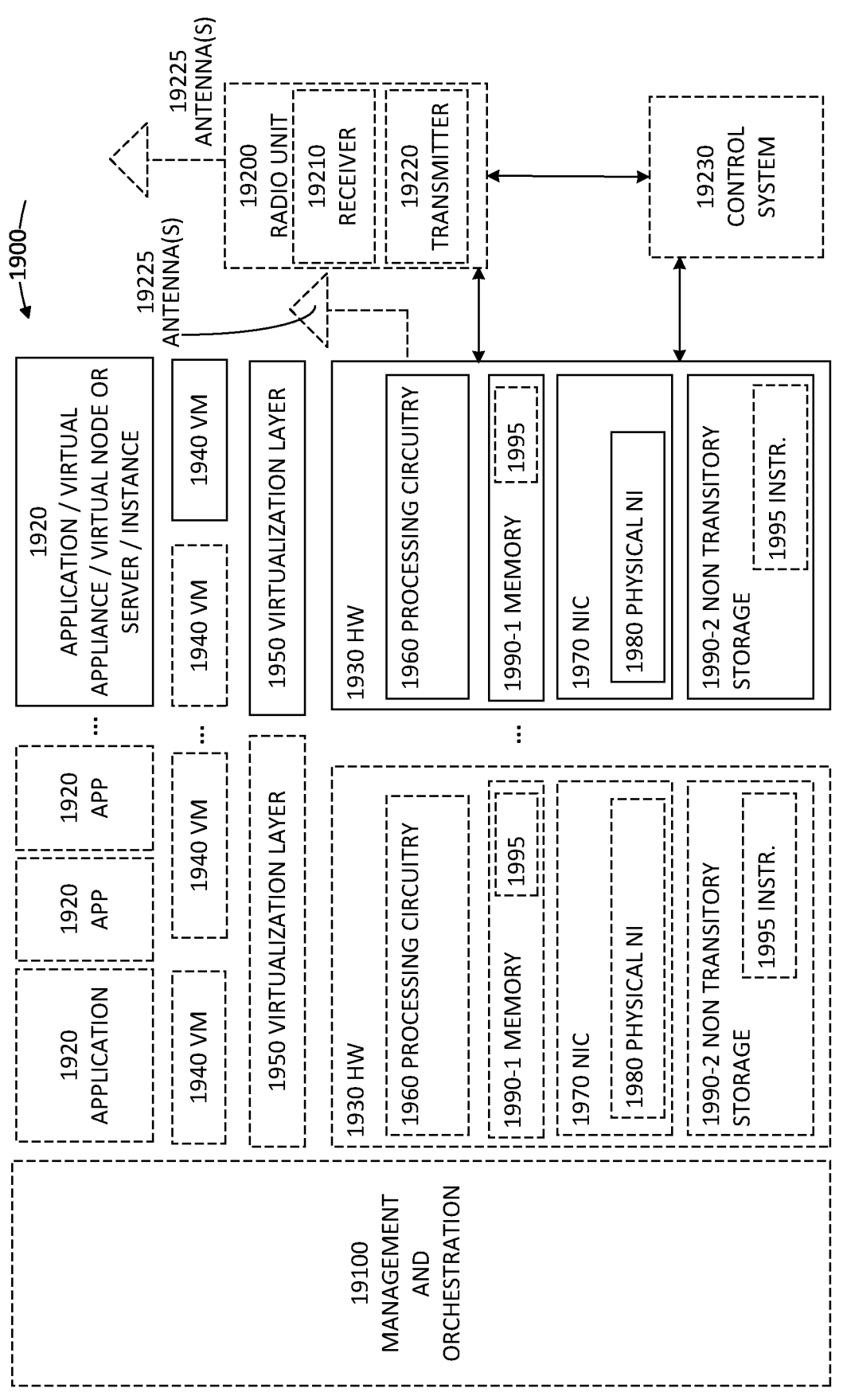
FIG. 19 is a block diagram of a virtualization environment according to some embodiments.

FIG. 19 is a schematic block diagram illustrating a virtualization environment 1900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1900 hosted by one or more of hardware nodes 1930. Further, in embodiments in which the virtual node is not a radio access node or does not require radio connectivity (e.g., a core network node), then the network node may be entirely virtualized.

The functions may be implemented by one or more applications 1920 (which may alternatively be called software instances, virtual appliances, network functions, virtual nodes, virtual network functions, etc.) operative to implement some of the features, functions, and/or benefits of some of the embodiments disclosed herein. Applications 1920 are run in virtualization environment 1900 which provides hardware 1930 comprising processing circuitry 1960 and memory 1990. Memory 1990 contains instructions 1995 executable by processing circuitry 1960 whereby application 1920 is operative to provide one or more of the features, benefits, and/or functions disclosed herein.

Virtualization environment 1900, comprises general-purpose or special-purpose network hardware devices 1930 comprising a set of one or more processors or processing circuitry 1960, which may be commercial off-the-shelf (COTS) processors, dedicated Application Specific Integrated Circuits (ASICs), or any other type of processing circuitry including digital or analog hardware components or special purpose processors. Each hardware device may comprise memory 1990-1 which may be non-persistent memory for temporarily storing instructions 1995 or software executed by processing circuitry 1960. Each hardware device may comprise one or more network interface controllers (NICs) 1970, also known as network interface cards, which include physical network interface 1980. Each hardware device may also include non-transitory, persistent, machine-readable storage media 1990-2 having stored therein software 1995 and/or instructions executable by processing circuitry 1960. Software 1995 may include any type of software including software for instantiating one or more virtualization layers 1950 (also referred to as hypervisors), software to execute virtual machines 1940 as well as software allowing it to execute functions, features and/or benefits described in relation with some embodiments described herein.

Virtual machines 1940, comprise virtual processing, virtual memory, virtual networking or interface and virtual storage, and may be run by a corresponding virtualization layer 1950 or hypervisor. Different embodiments of the instance of virtual appliance 1920 may be implemented on one or more of virtual machines 1940, and the implementations may be made in different ways.

During operation, processing circuitry 1960 executes software 1995 to instantiate the hypervisor or virtualization layer 1950, which may sometimes be referred to as a virtual machine monitor (VMM). Virtualization layer 1950 may present a virtual operating platform that appears like networking hardware to virtual machine 1940.

As shown in FIG. 19, hardware 1930 may be a standalone network node with generic or specific components. Hardware 1930 may comprise antenna 19225 and may implement some functions via virtualization. Alternatively, hardware 1930 may be part of a larger cluster of hardware (e.g. such as in a data center or customer premise equipment (CPE)) where many hardware nodes work together and are managed via management and orchestration (MANO) 19100, which, among others, oversees lifecycle management of applications 1920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1940 may be a software implementation of a physical machine that runs programs as if they were executing on a physical, non-virtualized machine. Each of virtual machines 1940, and that part of hardware 1930 that executes that virtual machine, be it hardware dedicated to that virtual machine and/or hardware shared by that virtual machine with others of the virtual machines 1940, forms a separate virtual network elements (VNE).

Still in the context of NFV, Virtual Network Function (VNF) is responsible for handling specific network functions that run in one or more virtual machines 1940 on top of hardware networking infrastructure 1930 and corresponds to application 1920 in FIG. 19.

In some embodiments, one or more radio units 19200 that each include one or more transmitters 19220 and one or more receivers 19210 may be coupled to one or more antennas 19225. Radio units 19200 may communicate directly with hardware nodes 1930 via one or more appropriate network interfaces and may be used in combination with the virtual components to provide a virtual node with radio capabilities, such as a radio access node or a base station.

In some embodiments, some signalling can be effected with the use of control system 19230 which may alternatively be used for communication between the hardware nodes 1930 and radio units 19200.

Figure 20:
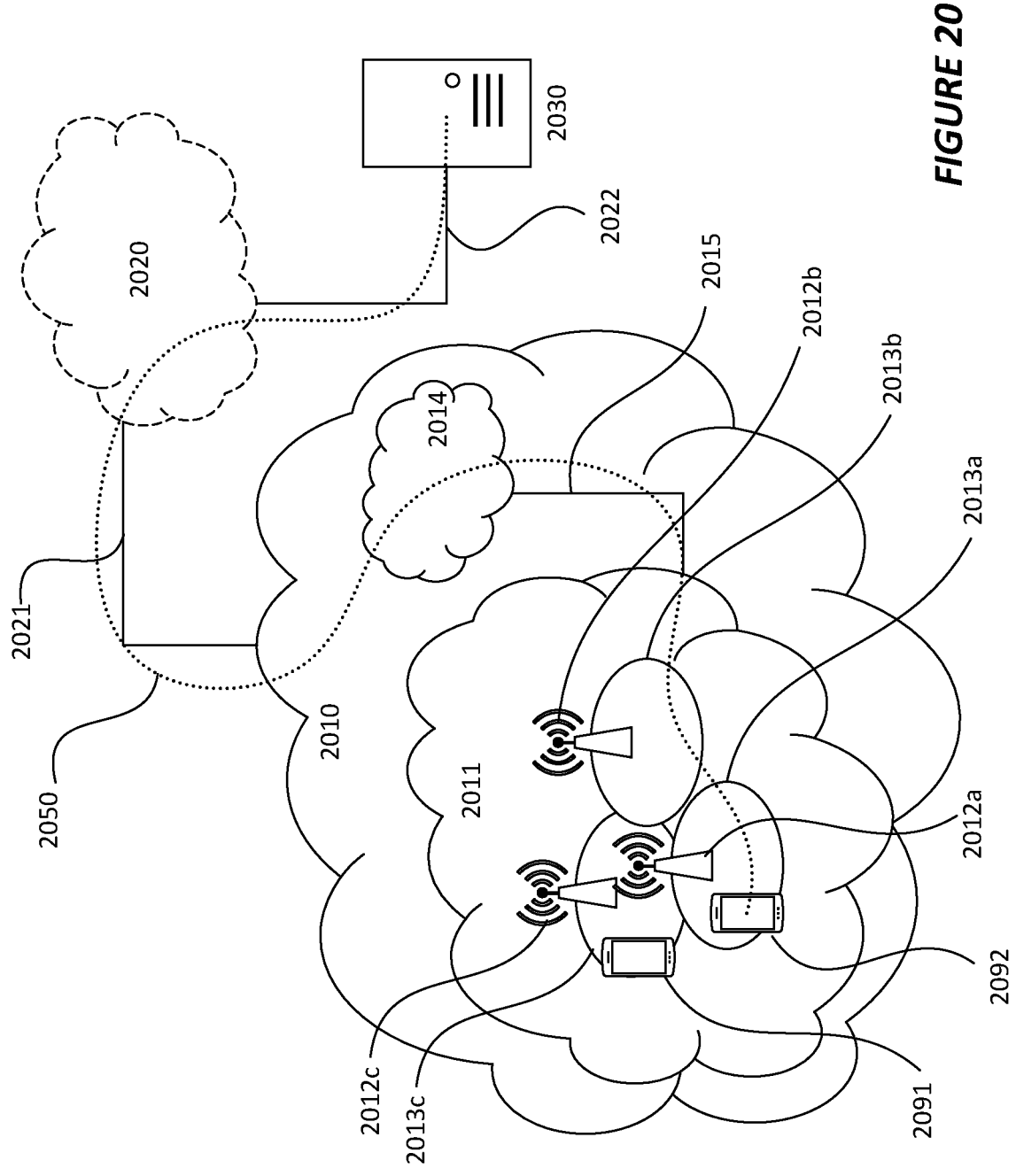
FIG. 20 is a block diagram of a communication network with a host computer according to some embodiments.

FIG. 20 illustrates a telecommunication network connected via an intermediate network to a host computer in accordance with some embodiments. In particular, with reference to FIG. 20, in accordance with an embodiment, a communication system includes telecommunication network 2010, such as a 3GPP-type cellular network, which comprises access network 2011, such as a radio access network, and core network 2014. Access network 2011 comprises a plurality of base stations 2012a, 2012b, 2012c, such as NBs, eNBs, gNBs or other types of wireless access points, each defining a corresponding coverage area 2013a, 2013b, 2013c. Each base station 2012a, 2012b, 2012c is connectable to core network 2014 over a wired or wireless connection 2015. A first UE 2091 located in coverage area 2013c is configured to wirelessly connect to, or be paged by, the corresponding base station 2012c. A second UE 2092 in coverage area 2013a is wirelessly connectable to the corresponding base station 2012a. While a plurality of UEs 2091, 2092 are illustrated in this example, the disclosed embodiments are equally applicable to a situation where a sole UE is in the coverage area or where a sole UE is connecting to the corresponding base station 2012.

Telecommunication network 2010 is itself connected to host computer 2030, which may be embodied in the hardware and/or software of a standalone server, a cloud-implemented server, a distributed server or as processing resources in a server farm. Host computer 2030 may be under the ownership or control of a service provider, or may be operated by the service provider or on behalf of the service provider. Connections 2021 and 2022 between telecommunication network 2010 and host computer 2030 may extend directly from core network 2014 to host computer 2030 or may go via an optional intermediate network 2020. Intermediate network 2020 may be one of, or a combination of more than one of, a public, private or hosted network; intermediate network 2020, if any, may be a backbone network or the Internet; in particular, intermediate network 2020 may comprise two or more sub-networks (not shown).

The communication system of FIG. 20 as a whole enables connectivity between the connected UEs 2091, 2092 and host computer 2030. The connectivity may be described as an over-the-top (OTT) connection 2050. Host computer 2030 and the connected UEs 2091, 2092 are configured to communicate data and/or signaling via OTT connection 2050, using access network 2011, core network 2014, any intermediate network 2020 and possible further infrastructure (not shown) as intermediaries. OTT connection 2050 may be transparent in the sense that the participating communication devices through which OTT connection 2050 passes are unaware of routing of uplink and downlink communications. For example, base station 2012 may not or need not be informed about the past routing of an incoming downlink communication with data originating from host computer 2030 to be forwarded (e.g., handed over) to a connected UE 2091. Similarly, base station 2012 need not be aware of the future routing of an outgoing uplink communication originating from the UE 2091 towards the host computer 2030.

Figure 21:
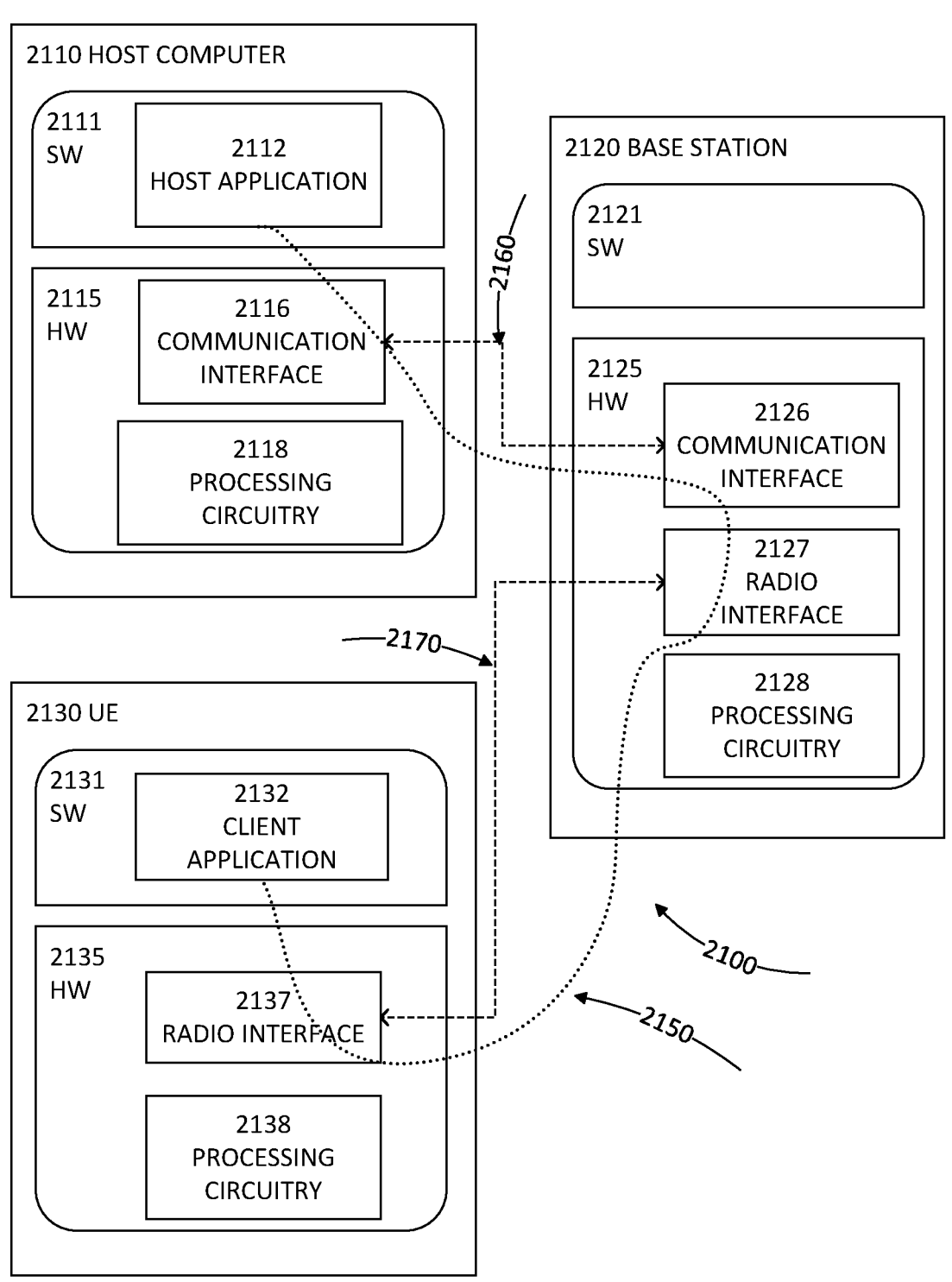
FIG. 21 is a block diagram of a host computer according to some embodiments.

Example implementations, in accordance with an embodiment, of the UE, base station and host computer discussed in the preceding paragraphs will now be described with reference to FIG. 21. FIG. 21 illustrates host computer communicating via a base station with a user equipment over a partially wireless connection in accordance with some embodiments In communication system 2100, host computer 2110 comprises hardware 2115 including communication interface 2116 configured to set up and maintain a wired or wireless connection with an interface of a different communication device of communication system 2100. Host computer 2110 further comprises processing circuitry 2118, which may have storage and/or processing capabilities. In particular, processing circuitry 2118 may comprise one or more programmable processors, application-specific integrated circuits, field programmable gate arrays or combinations of these (not shown) adapted to execute instructions. Host computer 2110 further comprises software 2111, which is stored in or accessible by host computer 2110 and executable by processing circuitry 2118. Software 2111 includes host application 2112. Host application 2112 may be operable to provide a service to a remote user, such as UE 2130 connecting via OTT connection 2150 terminating at UE 2130 and host computer 2110. In providing the service to the remote user, host application 2112 may provide user data which is transmitted using OTT connection 2150.

Communication system 2100 further includes base station 2120 provided in a telecommunication system and comprising hardware 2125 enabling it to communicate with host computer 2110 and with UE 2130. Hardware 2125 may include communication interface 2126 for setting up and maintaining a wired or wireless connection with an interface of a different communication device of communication system 2100, as well as radio interface 2127 for setting up and maintaining at least wireless connection 2170 with UE 2130 located in a coverage area (not shown in FIG. 21) served by base station 2120. Communication interface 2126 may be configured to facilitate connection 2160 to host computer 2110. Connection 2160 may be direct or it may pass through a core network (not shown in FIG. 21) of the telecommunication system and/or through one or more intermediate networks outside the telecommunication system. In the embodiment shown, hardware 2125 of base station 2120 further includes processing circuitry 2128, which may comprise one or more programmable processors, application-specific integrated circuits, field programmable gate arrays or combinations of these (not shown) adapted to execute instructions. Base station 2120 further has software 2121 stored internally or accessible via an external connection.

Communication system 2100 further includes UE 2130 already referred to. Its hardware 2135 may include radio interface 2137 configured to set up and maintain wireless connection 2170 with a base station serving a coverage area in which UE 2130 is currently located. Hardware 2135 of UE 2130 further includes processing circuitry 2138, which may comprise one or more programmable processors, application-specific integrated circuits, field programmable gate arrays or combinations of these (not shown) adapted to execute instructions. UE 2130 further comprises software 2131, which is stored in or accessible by UE 2130 and executable by processing circuitry 2138. Software 2131 includes client application 2132. Client application 2132 may be operable to provide a service to a human or non-human user via UE 2130, with the support of host computer 2110. In host computer 2110, an executing host application 2112 may communicate with the executing client application 2132 via OTT connection 2150 terminating at UE 2130 and host computer 2110. In providing the service to the user, client application 2132 may receive request data from host application 2112 and provide user data in response to the request data. OTT connection 2150 may transfer both the request data and the user data. Client application 2132 may interact with the user to generate the user data that it provides.

It is noted that host computer 2110, base station 2120 and UE 2130 illustrated in FIG. 21 may be similar or identical to host computer 2030, one of base stations 2012a, 2012b, 2012c and one of UEs 2091, 2092 of FIG. 20, respectively. This is to say, the inner workings of these entities may be as shown in FIG. 21 and independently, the surrounding network topology may be that of FIG. 20.

In FIG. 21, OTT connection 2150 has been drawn abstractly to illustrate the communication between host computer 2110 and UE 2130 via base station 2120, without explicit reference to any intermediary devices and the precise routing of messages via these devices. Network infrastructure may determine the routing, which it may be configured to hide from UE 2130 or from the service provider operating host computer 2110, or both. While OTT connection 2150 is active, the network infrastructure may further take decisions by which it dynamically changes the routing (e.g., on the basis of load balancing consideration or reconfiguration of the network).

Wireless connection 2170 between UE 2130 and base station 2120 is in accordance with the teachings of the embodiments described throughout this disclosure. One or more of the various embodiments improve the performance of OTT services provided to UE 2130 using OTT connection 2150, in which wireless connection 2170 forms the last segment.

A measurement procedure may be provided for the purpose of monitoring data rate, latency and other factors on which the one or more embodiments improve. There may further be an optional network functionality for reconfiguring OTT connection 2150 between host computer 2110 and UE 2130, in response to variations in the measurement results. The measurement procedure and/or the network functionality for reconfiguring OTT connection 2150 may be implemented in software 2111 and hardware 2115 of host computer 2110 or in software 2131 and hardware 2135 of UE 2130, or both. In embodiments, sensors (not shown) may be deployed in or in association with communication devices through which OTT connection 2150 passes; the sensors may participate in the measurement procedure by supplying values of the monitored quantities exemplified above, or supplying values of other physical quantities from which software 2111, 2131 may compute or estimate the monitored quantities. The reconfiguring of OTT connection 2150 may include message format, retransmission settings, preferred routing etc.; the reconfiguring need not affect base station 2120, and it may be unknown or imperceptible to base station 2120. Such procedures and functionalities may be known and practiced in the art. In certain embodiments, measurements may involve proprietary UE signaling facilitating host computer 2110's measurements of throughput, propagation times, latency and the like. The measurements may be implemented in that software 2111 and 2131 causes messages to be transmitted, in particular empty or 'dummy' messages, using OTT connection 2150 while it monitors propagation times, errors etc.

Figure 22:
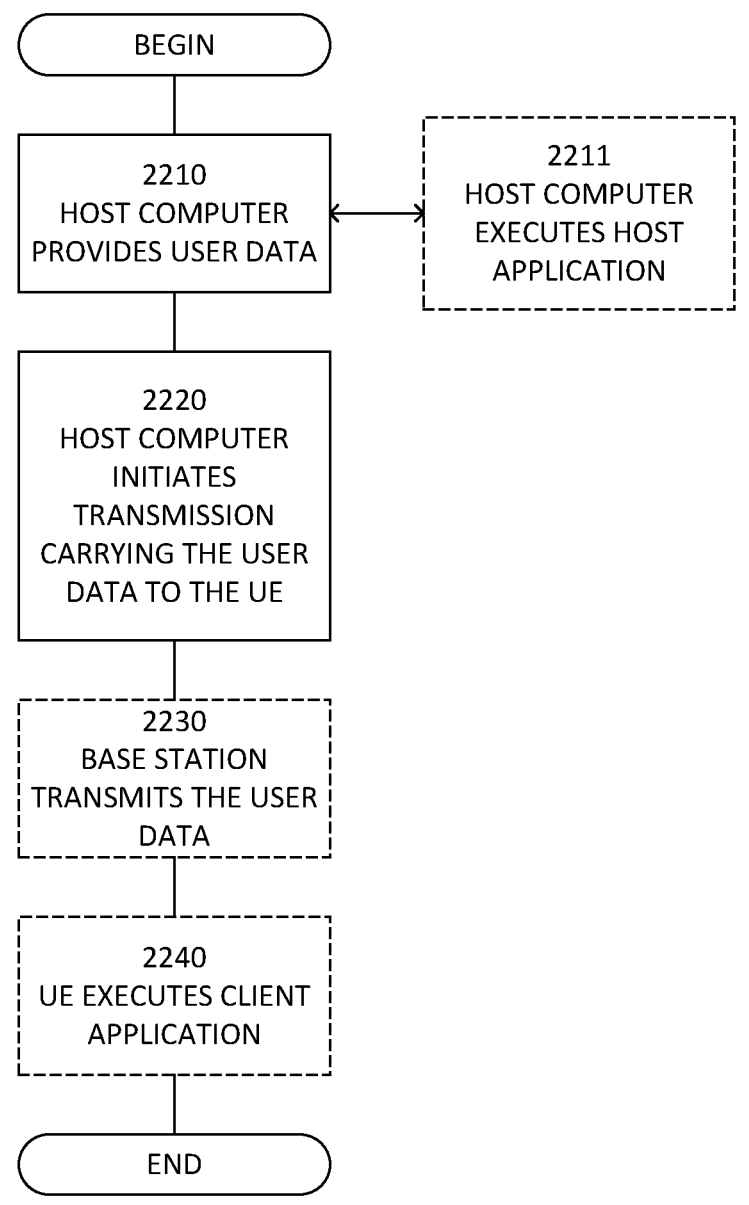
FIG. 22 is a flowchart illustrating a method implemented in a communication system, in accordance with one embodiment.

FIG. 22 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 22 will be included in this section. In step 2210, the host computer provides user data. In substep 2211 (which may be optional) of step 2210, the host computer provides the user data by executing a host application. In step 2220, the host computer initiates a transmission carrying the user data to the UE. In step 2230 (which may be optional), the base station transmits to the UE the user data which was carried in the transmission that the host computer initiated, in accordance with the teachings of the embodiments described throughout this disclosure. In step 2240 (which may also be optional), the UE executes a client application associated with the host application executed by the host computer.

Figure 23:
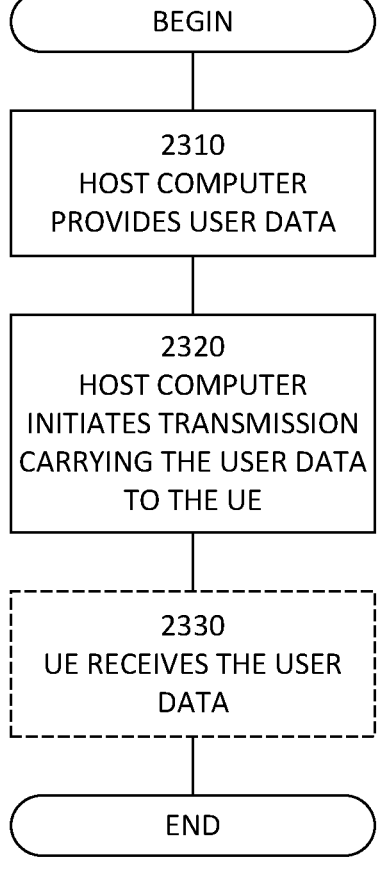
FIG. 23 is a flowchart illustrating a method implemented in a communication system, in accordance with one embodiment.

FIG. 23 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 23 will be included in this section. In step 2310 of the method, the host computer provides user data. In an optional substep (not shown) the host computer provides the user data by executing a host application. In step 2320, the host computer initiates a transmission carrying the user data to the UE. The transmission may pass via the base station, in accordance with the teachings of the embodiments described throughout this disclosure. In step 2330 (which may be optional), the UE receives the user data carried in the transmission.

Figure 24:
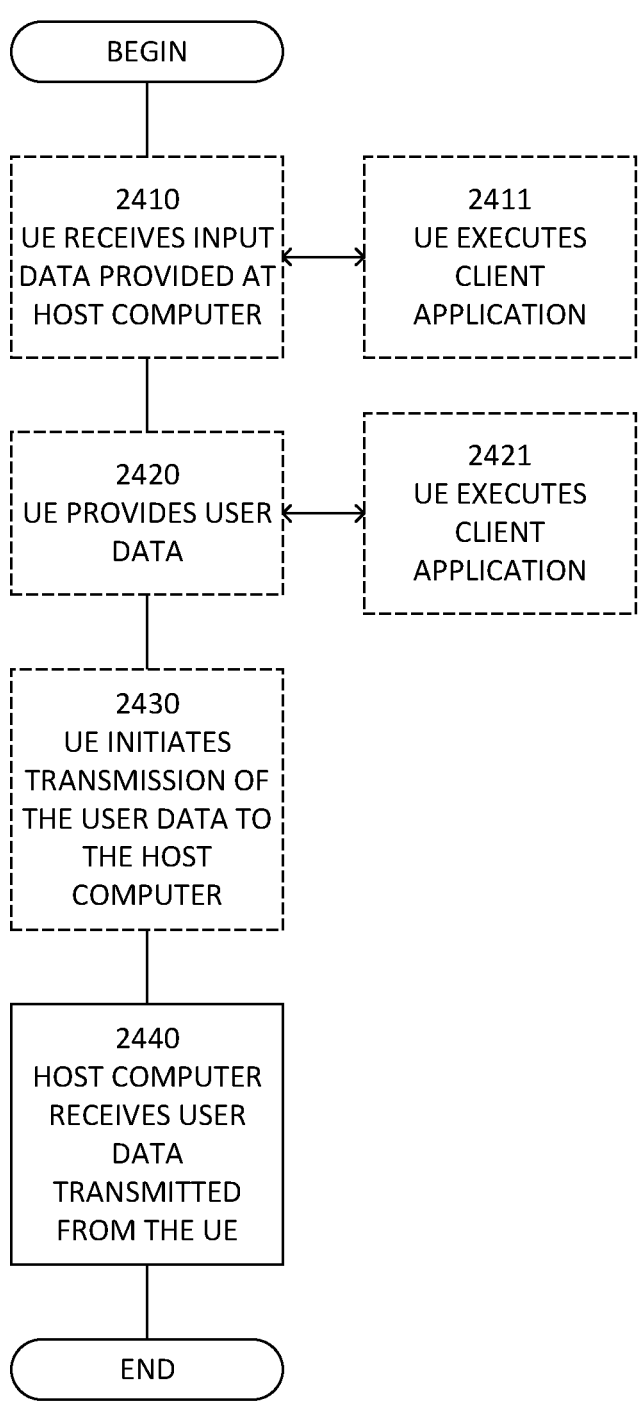
FIG. 24 is a flowchart illustrating a method implemented in a communication system, in accordance with one embodiment.

FIG. 24 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 24 will be included in this section. In step 2410 (which may be optional), the UE receives input data provided by the host computer. Additionally or alternatively, in step 2420, the UE provides user data. In substep 2421 (which may be optional) of step 2420, the UE provides the user data by executing a client application. In substep 2411 (which may be optional) of step 2410, the UE executes a client application which provides the user data in reaction to the received input data provided by the host computer. In providing the user data, the executed client application may further consider user input received from the user. Regardless of the specific manner in which the user data was provided, the UE initiates, in substep 2430 (which may be optional), transmission of the user data to the host computer. In step 2440 of the method, the host computer receives the user data transmitted from the UE, in accordance with the teachings of the embodiments described throughout this disclosure.

Figure 25:
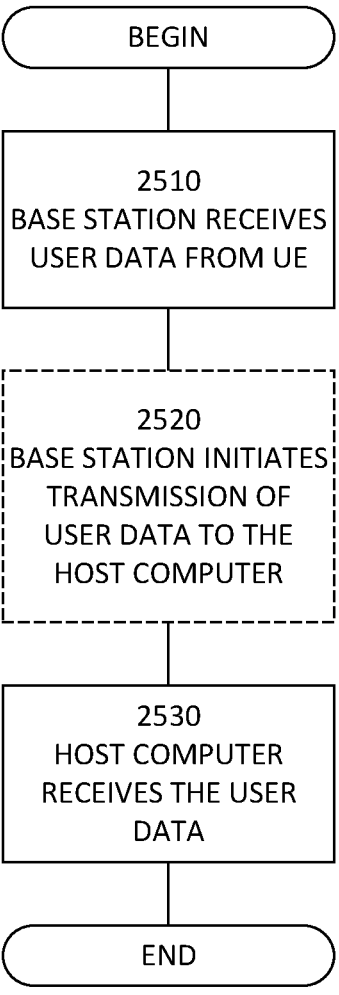
FIG. 25 is a flowchart illustrating a method implemented in a communication system, in accordance with one embodiment.

FIG. 25 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 25 will be included in this section. In step 2510 (which may be optional), in accordance with the teachings of the embodiments described throughout this disclosure, the base station receives user data from the UE. In step 2520 (which may be optional), the base station initiates transmission of the received user data to the host computer. In step 2530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

With this qualification in mind, the following groups of embodiments enumerate various aspects herein.

Group A Embodiments

A1. A method performed by a wireless device, the method comprising:

receiving, from a network node, an indication that indicates which network node controls sidelink configuration of the wireless device.

A2. A method performed by a wireless device, the method comprising:

receiving a sidelink configuration from each of multiple network nodes serving the wireless device; and selecting, from the received sidelink configurations, a sidelink configuration that is consistent or compatible with a sidelink configuration of another wireless device with which the wireless device is to communicate over a sidelink.

A3. The method of embodiment A2, further comprising transmitting, to each of one or more of the network nodes serving the wireless device, an indication of the selected sidelink configuration and/or an indication of whether the wireless device accepts or rejects the sidelink configuration received from the network node.

A4. The method of any of embodiments A2-A3, further comprising requesting a sidelink configuration from each of the multiple network nodes.

A5. The method of any of embodiments A2-A4, further comprising receiving, from each of one or more of the network nodes serving the wireless device, information identifying one or more other wireless devices to which the network node has sent the same sidelink configuration received from that network node.

A6. The method of any of embodiments A1-A5, wherein at least one of the network nodes acts as a master node for multi-connectivity operation, and at east one other of the network nodes acts as a secondary node for said multi-connectivity operation.

A7. The method of any of embodiments A1-A6, wherein a sidelink configuration comprises of one or more of:

sidelink radio bearer configuration;

quality of service flow to sidelink radio bearer mapping;

configuration of a resource pool for sidelink communication;

Radio Link Control, RLC, mode configuration comprising configuration of RLC unacknowledged mode or RLC acknowledged mode;

Logical Channel ID to RLC mode mapping; or default sidelink configuration parameters.

AA. The method of any of the previous embodiments, further comprising:

providing user data; and forwarding the user data to a host computer via the transmission to a base station.

Group B Embodiments

B1. A method performed by a network node, the method comprising:

controlling sidelink configuration of each of multiple wireless devices that are to communicate with one another over a sidelink.

B2. The method of embodiment B1, wherein said controlling is on the basis that the network node serves each of the multiple wireless devices.

B3. The method of any of embodiments B1-B2, further comprising deciding, by the network node, to control sidelink configuration of each of the multiple wireless devices, on the basis that the network node serves each of the multiple wireless devices.

B4. The method of any of embodiments B1-B3, wherein at least one of the multiple wireless devices is served by the network node and one or more other network nodes.

B5. The method of any of embodiments B1-B4, wherein the network node acts as a master node for at least one of the multiple wireless devices in multi-connectivity operation.

B6. The method of embodiment B5, wherein the network node acts as a secondary node for at least one other one of the multiple wireless devices in multi-connectivity.

B7. The method of any of embodiments B1-B6, wherein at least one of the multiple wireless devices is not configured with, or is not operating with, multi-connectivity.

B8. The method of any of embodiments B1-B7, further comprising determining, based at least in part on information received from another network node, that the multiple wireless devices are to communicate with one another over a sidelink.

B9. The method of embodiment B8, wherein the information received from another network node includes identifying information that identifies at least one of the multiple wireless devices.

B10. The method of embodiment B9, wherein the identifying information includes a Layer 2 identity of the at least one of the multiple wireless devices.

B11. The method of any of embodiments B1-610, further comprising transmitting, to each of one or more of the multiple wireless devices, an indication that indicates the network node controls sidelink configuration of the wireless device or indicates the network node controls sidelink configuration of each of the multiple wireless devices.

B12. The method of any of embodiments B1-B4 and B7-B11, wherein the network node is a central unit or a distributed unit of a radio network node.

B13. The method of any of embodiments B1-B12, wherein said controlling comprises, for each of the multiple wireless devices, generating a sidelink configuration and transmitting that sidelink configuration to the wireless device or to another network node for relay to the wireless device.

B14. The method of any of embodiments B1-B13, wherein said controlling comprises controlling sidelink configurations of the multiple wireless devices to be consistent or compatible with one another.

B15. The method of any of embodiments B1-B14, wherein sidelink configuration of a wireless device comprises of one or more of:

sidelink radio bearer configuration;

quality of service flow to sidelink radio bearer mapping;

configuration of a resource pool for sidelink communication;

Radio Link Control, RLC, mode configuration comprising configuration of RLC unacknowledged mode or RLC acknowledged mode;

Logical Channel ID to RLC mode mapping; or default sidelink configuration parameters.

B16. The method of any of embodiments B1-B15, wherein the multiple wireless devices are requesting or have requested sidelink configuration for the purpose of communicating with one another over a sidelink.

Group BB Embodiments

BB1. A method performed by a network node, the method comprising:

selecting, from among multiple candidate network nodes, a network node to control sidelink configuration of each of multiple wireless devices that are to communicate with one another over a sidelink.

BB2. The method of embodiment BB1, wherein said selecting comprises selecting a network node that serves each of the multiple wireless devices.

BB3. The method of any of embodiments BB1-BB2, further comprising transmitting, to one or more of the candidate network nodes and/or to one or more of the wireless devices, information indicating the network node selected to control sidelink configuration of each of the multiple wireless devices.

BB4. The method of any of embodiments BB1-BB3, wherein at least one of the multiple wireless devices is served by multiple network nodes in multi-connectivity operation.

BB5. The method of any of embodiments BB1-BB4, wherein the selected network node acts as a master node for at least one of the multiple wireless devices in multi-connectivity operation.

BB6. The method of embodiment BB5, wherein the selected network node acts as a secondary node for at least one other one of the multiple wireless devices in multi-connectivity.

BB7. The method of any of embodiments BB1-BB6, wherein at least one of the multiple wireless devices is not configured with, or is not operating with, multi-connectivity.

BB8. The method of any of embodiments BB1-BB7, further comprising determining, based at least in part on information received from another network node, that the multiple wireless devices are to communicate with one another over a sidelink.

BB9. The method of embodiment BB8, wherein the information received from another network node includes identifying information that identifies at least one of the multiple wireless devices.

BB10. The method of embodiment BB9, wherein the identifying information includes a Layer 2 identity of the at least one of the multiple wireless devices.

BB11. The method of any of embodiments BB1-BB10, further comprising transmitting, to each of one or more of the multiple wireless devices, an indication that indicates the network node selected to control sidelink configuration of the wireless device or indicates the network node selected to control sidelink configuration of each of the multiple wireless devices.

BB12. The method of any of embodiments BB1-BB4 and BB7-BB11, wherein the selected network node is a central unit or a distributed unit of a radio network node.

BB13. The method of any of embodiments BB1-BB12, wherein the network node selected to control sidelink configuration of each of the multiple wireless devices is selected to, for each of the multiple wireless devices, generate a sidelink configuration and transmit that sidelink configuration to the wireless device.

BB14. The method of any of embodiments BB1-BB13, wherein the network node selected to control sidelink configuration of each of the multiple wireless devices is selected to control sidelink configurations of the multiple wireless devices to be consistent or compatible with one another.

BB15. The method of any of embodiments BB1-BB14, wherein sidelink configuration of a wireless device comprises of one or more of:

sidelink radio bearer configuration;

quality of service flow to sidelink radio bearer mapping;

configuration of a resource pool for sidelink communication;

Radio Link Control, RLC, mode configuration comprising configuration of RLC unacknowledged mode or RLC acknowledged mode;

Logical Channel ID to RLC mode mapping; or default sidelink configuration parameters.

BB16. The method of any of embodiments BB1-BB15, wherein the multiple wireless devices are requesting or have requested sidelink configuration for the purpose of communicating with one another over a sidelink.

BB17. The method of any of embodiments BB1-BB16, wherein said selecting is performed responsive to receiving a request for sidelink configuration from one or more of the multiple wireless devices.

BB18. The method of any of embodiments BB1-BB16, wherein said selecting is performed responsive to receiving an inquiry from one of the candidate network nodes inquiring as to which network node is to control sidelink configuration of each of the multiple wireless devices.

BB19. The method of any of embodiments BB1-BB18, wherein said selecting is performed as part of setting up the sidelink between the wireless devices, as part of a procedure for modifying which network node acts as a master node for multi-connectivity operation of at least one of the wireless devices, or as part of a procedure for adding or modifying which network node acts as a secondary node for multi-connectivity operation of at least one of the wireless devices.

Group BBB Embodiments

BBB1. A method performed by a first network node, the method comprising:

coordinating with a second network node regarding sidelink configuration of each of multiple wireless devices that are to communicate with one another over a sidelink.

BBB2. The method of embodiment BBB1, wherein said coordinating comprises:

transmitting to the second network node information indicating one or more sidelink configurations able to be used at the first network node; and/or receiving from the second network node information indicating one or more sidelink configurations able to be used at the second network node.

BBB3. The method of any of embodiments BBB1-BBB2, wherein said coordinating comprises:

transmitting to the second network node information indicating one or more sidelink configurations that the second network node is to use; and/or receiving from the second network node information indicating one or more sidelink configurations that the first network node is to use.

BBB4. The method of any of embodiments BBB1-BBB2, wherein said coordinating comprises:

transmitting to the second network node information indicating one or more sidelink configurations that the first network node proposes to use; and/or receiving from the second network node information indicating one or more sidelink configurations that the second network node proposes to use.

BBB5. The method of any of embodiments BBB1-BBB2, wherein said coordinating comprises:

transmitting to the second network node information indicating one or more sidelink configurations that the first network node accepts or rejects for use; and/or receiving from the second network node information indicating one or more sidelink configurations that the second network node accepts or rejects for use.

BBB6. The method of any of embodiments BBB1-BBB5, wherein the first network node acts as a master node for at least one of the multiple wireless devices in multi-connectivity operation, and wherein the second network node as a secondary node for at least one other of the multiple wireless devices in multi-connectivity operation.

BBB7. The method of any of embodiments BBB1-BBB6, wherein at least two of the wireless devices have no serving network node in common.

BBB8. The method of any of embodiments BBB1-BBB7, further comprising deciding, based on said coordinating, sidelink configuration of each of one or more of the multiple wireless devices that the first network node serves.

BBB9. The method of any of embodiments BBB1-BBB8, wherein said coordinating is performed during, or as part of, a procedure for adding or modifying a second node for at least one of the multiple wireless devices in multi-connectivity.

BBB10. The method of any of embodiments BBB1-BBB8, wherein said coordinating is performed during, or as part of, a procedure for handover of one or more of the multiple wireless devices.

BBB11. The method of any of embodiments BBB1-BBB10, wherein at least one of the multiple wireless devices is served by multiple network nodes.

BBB12. The method of embodiment BBB8, further comprising transmitting the decided sidelink configuration towards each of the one or more of the multiple wireless devices that the first network node serves.

BBB13. The method of any of embodiments BBB1-BBB13, wherein sidelink configuration of a wireless device comprises of one or more of:

sidelink radio bearer configuration;

quality of service flow to sidelink radio bearer mapping;

configuration of a resource pool for sidelink communication;

Radio Link Control, RLC, mode configuration comprising configuration of RLC unacknowledged mode or RLC acknowledged mode;

Logical Channel ID to RLC mode mapping; or default sidelink configuration parameters.

BBB14. The method of any of embodiments BBB1-BBB14, wherein the multiple wireless devices are requesting or have requested sidelink configuration for the purpose of communicating with one another over a sidelink.

BB. The method of any of the previous embodiments, further comprising:

obtaining user data; and forwarding the user data to a host computer or a wireless device.

Group C Embodiments

C1. A wireless device configured to perform any of the steps of any of the Group A embodiments.

C2. A wireless device comprising processing circuitry configured to perform any of the steps of any of the Group A embodiments.

C3. A wireless device comprising:

communication circuitry; and processing circuitry configured to perform any of the steps of any of the Group A embodiments.

C4. A wireless device comprising:

processing circuitry configured to perform any of the steps of any of the Group A embodiments; and power supply circuitry configured to supply power to the wireless device.

C5. A wireless device comprising:

processing circuitry and memory, the memory containing instructions executable by the processing circuitry whereby the wireless device is configured to perform any of the steps of any of the Group A embodiments.

C6. A user equipment (UE) comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

C7. A computer program comprising instructions which, when executed by at least one processor of a wireless device, causes the wireless device to carry out the steps of any of the Group A embodiments.

C8. A carrier containing the computer program of embodiment C7, wherein the carrier is one of an electronic signal, optical signal, radio signal, or computer readable storage medium.

C9. A radio network node configured to perform any of the steps of any of the Group B embodiments.

C10. A radio network node comprising processing circuitry configured to perform any of the steps of any of the Group B embodiments.

C11. A radio network node comprising:

communication circuitry; and processing circuitry configured to perform any of the steps of any of the Group B embodiments.

C12. A radio network node comprising:

processing circuitry configured to perform any of the steps of any of the Group B embodiments;

power supply circuitry configured to supply power to the radio network node.

C13. A radio network node comprising:

processing circuitry and memory, the memory containing instructions executable by the processing circuitry whereby the radio network node is configured to perform any of the steps of any of the Group B embodiments.

C14. The radio network node of any of embodiments C9-C13, wherein the radio network node is a base station.

C15. A computer program comprising instructions which, when executed by at least one processor of a radio network node, causes the radio network node to carry out the steps of any of the Group B embodiments.

C16. The computer program of embodiment C14, wherein the radio network node is a base station.

C17. A carrier containing the computer program of any of embodiments C15-C16, wherein the carrier is one of an electronic signal, optical signal, radio signal, or computer readable storage medium.

Group D Embodiments

D1. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

D2. The communication system of the previous embodiment further including the base station.

D3. The communication system of the previous 2 embodiments, further including the UE, wherein the UE is configured to communicate with the base station.

D4. The communication system of the previous 3 embodiments, wherein:

the processing circuitry of the host computer is configured to execute a host application, thereby providing the user data; and the UE comprises processing circuitry configured to execute a client application associated with the host application.

D5. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:

the processing circuitry of the host computer is configured to execute a host application, thereby providing the user data; and the UE's processing circuitry is configured to execute a client application associated with the host application.

D12. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:

the processing circuitry of the host computer is configured to execute a host application; and the UE's processing circuitry is configured to execute a client application associated with the host application, thereby providing the user data.

D18. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

D19. A method implemented in a communication system including a host computer, a base station and a user equipment (UE), the method comprising:

at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:

at the UE, executing a client application, thereby providing the user data to be transmitted; and at the host computer, executing a host application associated with the client application.

D22. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:

the processing circuitry of the host computer is configured to execute a host application;

the UE is configured to execute a client application associated with the host application, thereby providing the user data to be received by the host computer.

D27. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

What is claimed is:

1. A method performed by a first wireless device, the method comprising:

receiving a sidelink configuration from each of multiple network nodes serving the first wireless device;

selecting, from the received sidelink configurations, a sidelink configuration that is consistent or compatible with a sidelink configuration of a second wireless device with which the first wireless device is to communicate over a sidelink, wherein the selected sidelink configuration is selected based on a determination that the selected sidelink configuration is consistent or compatible with the sidelink configuration of the second wireless device; and transmitting, to each of one or more of the network nodes serving the first wireless device, an indication of the selected sidelink configuration;

wherein a sidelink configuration comprises a Radio Link Control (RLC) mode configuration comprising configuration of RLC unacknowledged mode or RLC acknowledged mode;

wherein said selecting comprises selecting, from the received sidelink configurations, a sidelink configuration that comprises the same RLC mode configuration as an RLC mode configuration of the sidelink configuration of the second wireless device with which the first wireless device is to communicate over the sidelink, wherein the selected sidelink configuration is selected based on the selected sidelink configuration comprising the same RLC mode configuration as the RLC mode configuration of the sidelink configuration of the second wireless device with which the first wireless device is to communicate over the sidelink.

2. The method of claim 1, wherein a sidelink configuration further comprises a Logical Channel ID to RLC mode mapping, and wherein said selecting comprises selecting, from the received sidelink configurations, a sidelink configuration that further comprises the same Logical Channel ID to RLC mode mapping as a Logical Channel ID to RLC mode mapping of the sidelink configuration of the second wireless device with which the first wireless device is to communicate over the sidelink, wherein the selected sidelink configuration is selected further based on the selected sidelink configuration comprising the same Logical Channel ID to RLC mode mapping as the Logical Channel ID to RLC mode mapping of the sidelink configuration of the second wireless device with which the first wireless device is to communicate over the sidelink.

3. The method of claim 1, wherein a sidelink configuration further comprises at least one of any one or more of:

sidelink radio bearer configuration;

quality of service flow to sidelink radio bearer mapping;

configuration of a resource pool for sidelink communication;

Logical Channel ID to RLC mode mapping; and default sidelink configuration parameters.

4. The method of claim 1, wherein at least one of the network nodes acts as a master node for multi-connectivity operation, and at least one other of the network nodes acts as a secondary node for said multi-connectivity operation.

5. The method of claim 1, further comprising requesting a sidelink configuration from each of the multiple network nodes.

6. The method of claim 1, further comprising receiving, from each of one or more of the network nodes serving the first wireless device, information identifying one or more other wireless devices to which the network node has sent the same sidelink configuration received from that network node.

7. A first wireless device comprising:

communication circuitry; and processing circuitry configured to:

receive a sidelink configuration from each of multiple network nodes serving the first wireless device; and select, from the received sidelink configurations, a sidelink configuration that is consistent or compatible with a sidelink configuration of a second wireless device with which the first wireless device is to communicate over a sidelink, wherein the selected sidelink configuration is selected based on a determination that the selected sidelink configuration is consistent or compatible with the sidelink configuration of the second wireless device; and transmit, to each of one or more of the network nodes serving the first wireless device, an indication of the selected sidelink configuration;

wherein a sidelink configuration comprises a Radio Link Control (RLC) mode configuration comprising configuration of RLC unacknowledged mode or RLC acknowledged mode;

wherein the processing circuitry is configured to select, from the received sidelink configurations, a sidelink configuration that comprises the same RLC mode configuration as an RLC mode configuration of the sidelink configuration of the second wireless device with which the first wireless device is to communicate over the sidelink, wherein the selected sidelink configuration is selected based on the selected sidelink configuration comprising the same RLC mode configuration as the RLC mode configuration of the sidelink configuration of the second wireless device with which the first wireless device is to communicate over the sidelink.

* * * * *